United States Patent [19]

Cypher et al.

[11] Patent Number: 5,513,371
[45] Date of Patent: Apr. 30, 1996

[54] HIERARCHICAL INTERCONNECTION NETWORK ARCHITECTURE FOR PARALLEL PROCESSING, HAVING INTERCONNECTIONS BETWEEN BIT-ADDRESSIBLE NODES BASED ON ADDRESS BIT PERMUTATIONS

[75] Inventors: Robert E. Cypher; Jorge L. C. Sanz, both of Los Gatos, Calif.

[73] Assignee: International Business Machines Corporation, Armonk, N.Y.

[21] Appl. No.: 378,981

[22] Filed: Jan. 24, 1995

Related U.S. Application Data

[63] Continuation of Ser. No. 818,028, Jan. 7, 1992, abandoned.

[51] Int. Cl.$^6$ .................................................. G06F 15/00
[52] U.S. Cl. ........................... 395/800; 370/60; 364/229; 364/DIG. 1
[58] Field of Search .............................. 395/800; 370/60, 370/600; 364/229, DIG. 1

[56] References Cited

U.S. PATENT DOCUMENTS

| | | | |
|---|---|---|---|
| 4,583,164 | 4/1986 | Tolle | 395/600 |
| 4,591,981 | 5/1986 | Kassabov | 395/800 |
| 4,622,632 | 11/1986 | Tanimoto et al. | 395/800 |
| 4,805,091 | 2/1989 | Thiel et al. | 395/800 |
| 4,814,970 | 3/1989 | Barbagelata et al. | 395/200 |
| 4,843,540 | 6/1989 | Stolfo | 395/650 |
| 4,901,360 | 2/1990 | Shu et al. | 382/41 |
| 5,020,059 | 5/1991 | Gorin et al. | 371/11.3 |
| 5,134,690 | 7/1992 | Samatham | 395/200 |
| 5,173,689 | 12/1992 | Kusano | 340/827 |

OTHER PUBLICATIONS

R. Cypher & J. L. C. Sanz, Hierarchical Shuffle–Exchange and de Bruijn Networks, Proceedings of the 4th IEEE Symposium on Parallel Dist. Processing, pp. 491–496, Dec. 14, 1992.

C. Chen, D. P. Agrawal, J. R. Burke, Proceedings, Advanced Computer Tech., Reliable Sys. & Applications, 5th Annual European Computer Conf. Design and WSI Layout for DBCube Networks, pp. 363–367, May 13–16, 1991.

C. Chen, D. P. Agrawal, J. R. Burke, A Class of Hierarchical Networks for VLSI/WSI Based Multicomputers, WLSI Design '91, Digest of Papers, 4th CSI/IEEE International Symposium on VLSI Design, New Delhi, India, pp. 267–272, Jan. 4–8, 1991.

K. Padmanabhan, Hierarchical Communication in Cube-Connected Multiprocessors, Proceedings, 10th International Conf. on Distributed Computing Systems, IEEE pp. 270–277, May 28 to Jun. 1, 1990.

T. Lang, H. Stone, A Shuffle–Exchange Network with Simplified Control, IEEE Transactions on Computers, vol. C–25 No. 1, pp. 55–65, Jan. 1976.

Roychowdhury et al., Efficient Algorithms for Reconfiguration in VLSI/WSI Arrays, IEEE Trans. on Computers, vol. 39, No. 4, Apr. 1990.

(List continued on next page.)

Primary Examiner—Alyssa H. Bowler
Assistant Examiner—John Harrity
Attorney, Agent, or Firm—James C. Pintner; Joseph J. Kaliko

[57] ABSTRACT

Two new classes of interconnection networks are described. The new classes of interconnection networks are referred to herein as the hierarchical shuffle-exchange (HSE) and hierarchical de Bruijn (HdB) networks. The new HSE and HdB networks are highly regular and scalable and are thus well suited to VSLI implementation. In addition, they can be adjusted to match any set of packaging constraints. These new networks are also efficient in supporting the execution of a wide range of algorithms on computers whose processors are interconnected via one of the networks fabricated in accordance with the teachings of the invention. Such computers, also contemplated by the invention, are referred to herein as HSE and HbB computers. Furthermore, methods for implementing the aforementioned wide range of algorithms, particularly those in the classes of Ascend and Descend algorithms, on the novel HSE and HdB computers, constitute a further aspect of the invention.

10 Claims, 6 Drawing Sheets

OTHER PUBLICATIONS

O. Collins, "Wiring Viterbi Decoders (Splitting deBruijn Graphs)", NASA, Pasadena, CA, The Telecommunications & Data Acquisition Progress Report 42–96, Oct./Dec. 1988.

Georgescu, "Communication in Parallel Processing Systems," Studies and Researches in Computer and Informatics, vol. 1, No. 1, Mar. 1990, pp. 7–44.

Hwang, "Hypernet: A Communication–Efficient Architecture for Constructing Massively Parallel Computers," IEEE Transactions on Computers, C–36(12), Dec. 1987, pp. 1450–1466.

Kumar et al., "The GF11 Parallel Computer: Programming and Performance," IBM Research Report RC15494 (#68945), Feb. 1990.

Fulgham et al., "A Comparison of SIMD Hypercube Routing Strategies," Proceedings of the International Conference on Parallel Processing, vol. III, 1990, pp. 236–243.

Cypher et al., "SIMD Architectures and Algorithms for Image Processing and Computer Vision," IEEE Transactions on Acoustics, Speech, and Signal Processing, 37(12), Dec. 1989, pp. 2158–2174.

Samatham et al., "The DeBruun Multiprocessor Network: A Versatile Parallel Processing and Sorting Network for VLSI," IEEE Transactions on Computers, 38(4), Apr. 1989, pp. 567–581.

Cypher, "Theoretical Aspects of VLSI PIN Limitations," Technical Report 89–02–01, University of Washington, Department of Computer Science, Feb. 1989.

Dandamudi et al., "Hierarchical Interconnection Networks for Multiprocessor Systems," IEEE Transactions on Computers, 39(6), Jun. 1990, pp. 786–797.

Ghose et al., "The Design and Evaluation of the Hierarchical Cubic Network," Proceedings of the International Conference on Parallel Processing, 1990, pp. 355–362.

Nassimi et al., "Data Broadcasting in SIMD Computers," IEEE Transactions on Computers, C–30(2), Feb. 1981, pp. 101–107.

Schwartz, "Ultracomputers," ACM Transactions on Programming Languages and Systems, 2(4), Oct. 1980, pp. 484–521.

Stone, "Parallel Processing with the Perfect Shuffle," IEEE Transactions on Computers, C–20(2), Feb. 1971, pp. 153–161.

Bermond et al., "DeBruijn and Kautz Networks: A Competitor for the Hypercube?" Hypercube and Distributed Computers, 1989, pp. 279–293.

Preparata et al., "The Cube–Connected Cycles: A Versatile Network for Parallel Computation," Communications of the ACM, 24(5), pp. 300–309, May 1981.

Batcher, "Sorting Networks and their Applications," Proceedings of the AFIPS Spring Joint Computer Conference, Apr. 1968, pp. 307–314.

Benes, "Optimal Rearrangeable Multistage Connecting Networks," The Bell System Technical Journal, Jul. 1964, pp. 1641–1656.

Waksman, "A Permutation Network," Journal of the ACM, 15(1), Jan. 1968, pp. 159–163.

Schwartz, "Fine Grained and Coarse Grained Parallel Supercomputers, or, Does Anything But Pin Count Matter," Proceedings of the Design Development and Manufacture of Large Computer Systems, Oct. 1984.

Lin et al., "Efficient Histogramming on Hypercube SIMD Machines," Computer Vision, Graphics and Image Processing, 49(1), Jan. 1990, pp. 104–120.

HIERARCHICAL INTERCONNECTION NETWORK ARCHITECTURE FOR PARALLEL PROCESSING, HAVING INTERCONNECTIONS BETWEEN BIT-ADDRESSIBLE NODES BASED ON ADDRESS BIT PERMUTATIONS

This is a continuation of application Ser. No. 07/818,028 filed on Jan. 7, 1992, now abandoned.

BACKGROUND OF THE INVENTION

1. Field of the Invention

The invention relates generally to interconnection networks for parallel computers. More particularly, the invention relates to techniques for interconnecting and packaging processors in a parallel computer such that (1) global communication between processors is supported efficiently, (2) the parallel computer can be partitioned into identical components (i.e., chips, boards, or racks) that can be used to create parallel computers with arbitrarily large numbers of processors, and (3) the parallel computer can be customized to match the packaging constraints imposed by each level of the packaging hierarchy.

In more specific terms, given N, the desired number of processors, and given a set of packaging constraints which state (a) the maximum number of components in each level of the packaging hierarchy that can be placed in a single component in the next level of the packaging hierarchy; and (b) the maximum number of wires that can leave a single component in each level of the packaging hierarchy, one aspect of the invention teaches how the processors can be interconnected and packaged such that (1) all of the packaging constraints are satisfied, (2) each component in each level of the packaging hierarchy is identical to every other component in the same level, (3) the components at each level of the packaging hierarchy can be re-used to create parallel machines with more processors, and (4) the resulting parallel computer efficiently supports global communication such as that required by the Fast Fourier Transform (FFT), the bitonic sort, the Benes permutation algorithm, and all algorithms in the classes Ascend and Descend.

The Fast Fourier Transform is described by Preparata et al in an article entitled "The Cube-Connected Cycles: A Versatile Network For Parallel Computation", published in the Communications of the ACM, 24(5): 300–309, May, 1981; the bitonic sort is described in the aforementioned Preparata et al publication and in an article by K. E. Batcher entitled "Sorting Networks and Their Applications", published in the Proceedings of the AFIPS Spring Joint Computer Conference, pages 307–314, 1968; the Benes permutation algorithm is described in the aforementioned Preparata et al publication, in articles by V. E. Benes entitled "Mathematical Theory Of Connecting Networks and Telephone Traffic", published by the Academic Press, 1965, and "Optimal Rearrangeable Multistage Connection Networks", published in the Bell System Technical Journal, 43:1641–1656, 1964, and an article by A. Waksman entitled "A Permutation Network" published in the Journal of the ACM, 15(1):159–163, January, 1968; and algorithms in the classes Ascend and Descend are described in the aforementioned Preparata et al publication. All of the above identified publications are hereby incorporated herein by reference.

According to a further aspect of the invention, an efficient technique is taught for implementing a wide class of parallel algorithms, including all of those algorithms in the classes Ascend and Descend, on the parallel computers as described.

2. Description of the Related Art

Many parallel computers consist of multiple processors, each with its own associated memory, and communication links that connect certain pairs of processors. A key issue in the design of such a parallel computer is the arrangement of the communication links, which are referred to collectively as the "interconnection network". The design of the interconnection network represents a trade-off between the communication requirements of the algorithms which will be implemented on the parallel machine and the packaging constraints imposed by technological limitations.

More specifically, many algorithms require global communication patterns in which each processor sends messages to a large number of other processors, some of which may be far away in the physical implementation of the parallel machine. The FFT, the bitonic sort, and the algorithms in the classes Ascend and Descend (referred to hereinabove) are examples of algorithms which require such global communication. Thus, these algorithms could best be supported by providing a high-bandwidth connection between each processor and all (or a large number) of the other processors.

On the other hand, technological constraints make it impossible to provide a high-bandwidth connection between each processor and all of the remaining processors. In particular, parallel computers are typically implemented using a packaging hierarchy consisting of two or more levels. For example, each processor may occupy a single chip, while multiple chips are placed on a single board, multiple boards are combined to create modules, multiple modules are combined to create racks, and multiple racks are combined to create the complete parallel computer. Each level of this packaging hierarchy imposes bandwidth constraints, called pin limitations, that limit the number of wires that can leave each component in the given level of the packaging hierarchy.

In addition to pin limitations, the packaging hierarchy places a number of other constraints on cost-effective implementations of parallel computers. Due to the costs of designing and manufacturing different components, it is preferable to have all components in each level of the packaging hierarchy be identical to all other components in the same level. Such an implementation will be referred to as a uniform implementation. Also, parallel computers are typically manufactured in a range of sizes. Even if the implementation for any given number of processors is uniform, it is possible that different components are needed for different size machines. A parallel computer architecture which can be implemented uniformly using the same components in machines with different numbers of processors will be referred to herein as "scalable".

A large number of different interconnection networks have been proposed for parallel computers. However, all of the previously proposed networks fail to provide one or more of the following desirable features: (1) efficient support of global communication, (2) small pin requirements which match the pin limitations of each level in the packaging hierarchy, and (3) a regular structure which allows a uniform and scalable implementation of parallel computers which utilize the given interconnection network.

For example, many parallel computers use a 2-dimensional or 3-dimensional mesh interconnection network. Examples of parallel computers with 2-dimensional mesh interconnection networks include the "MPP" manufactured by Goodyear Aerospace, the "MP-I" manufactured by MAS- PAR, and the "Paragon" manufactured by Intel The "J-Machine" which is under development at MIT, has a 3-dimensional mesh interconnection network. Although parallel computers with mesh interconnection networks can be packaged efficiently, they cannot support global communication efficiently due to their large diameter. In particular, an N processor parallel computer with a 2-dimensional mesh network has a diameter that is proportional to $N^{1/2}$, while such a computer with a 3-dimensional mesh network has a diameter that is proportional to $N^{1/3}$.

U.S. Pat. No. 4,843,540, to Stolfo, U.S. Pat. No. 4,591,981, to Kassabov, and U.S. Pat. No. 4,583,164, to Tolle, all describe tree-structured interconnection networks. Although trees have small pin requirements, they cannot support global communication effectively because the root of the tree becomes a bottleneck through which a large number of messages are forced to pass.

Another important type of interconnection network is the hypercube. Commercial parallel computers based on the hypercube topology include the "NCUBE/10" from NCUBE, Inc., the "iPSC/2" from Intel, and the "CM-2" from Thinking Machines. U.S. Pat. No. 4,805,091, to Thiel et al describes a technique for packaging parallel computers with the hypercube topology. Although parallel computers based on the hypercube technology having a few thousand processors have been built, pin limitations have forced the connections to be very narrow (such as one bit wide), thus limiting communication performance. Furthermore, hypercube computers (i.e., those based on a hypercube topology) with more processors require more pins per packaging component, so pin limitations prevent hypercube computers with arbitrarily large numbers of processors from being constructed. Finally, hypercube computers are not scalable, as different components must be used in parallel computers with different numbers of processors.

Several interconnection networks which are related to the hypercube have been proposed for use in parallel computers. These include the shuffle-exchange as described in (1) an article by Nassimi et al entitled "Data Broadcasting In SIMD Computers" published in the IEEE Transactions On Computers, C-36(12):1450–1466, December, 1987, (2) an article by J. T. Schwartz entitled "Ultracomputers", published in the ACM Transactions On Programming Languages and Systems, 2(4):484–521, October, 1980, and (3) an article by H. S. Stone entitled "Parallel Processing With The Perfect Shuffle" published in the IEEE Transactions On Computers, C-20(2):153–161, February, 1971; the de Bruijn network, described in an article by Bermond et al entitled "de Bruijn and Kautz Networks: A Competitor For The Hypercube?", published in Hypercube and Distributed Computers, pages 279–293 by Elsevier Science Publishers B.V. (North Holland), 1989, and an article by Samatham et al entitled "The de Bruijn Multiprocessor Network: A Versatile Parallel Processing and Sorting Network For VLSI" published in IEEE Transactions On Computers, 38(4):567–581, April, 1989; and the cube-connected cycles described in the aforementioned Preparata et al publication.

Both the shuffle-exchange and de Bruijn networks have irregular structures, and as a result, there is no known uniform implementation for parallel computers based on either of these networks which has small pin requirements. Parallel computers with the cube-connected cycles network can be implemented in a uniform manner with small pin requirements, but this implementation is not scalable. Also, when pin limitations are taken into account, all of these networks are less efficient in supporting algorithms in the classes Ascend and Descend than are the new hierarchical networks presented herein.

Finally, a number of computers with hierarchical interconnection networks have been proposed. As indicated hereinabove, Schwartz proposed the layered shuffle-exchange computer, which has a two-level network that consists of a number of identical components, such as chips or boards. Although the layered shuffle-exchange computer is uniform and scalable, its diameter is proportional to the number of packaging components (e.g., chips or boards) that are used, so it is not efficient when implementing global communication in a large parallel machine. The shuffle-shift shuffle-exchange computers defined by R. Cypher in an article entitled "Theoretical Aspects of VLSI Pin Limitations" Technical Report T.R. 89-02-01, published by the University of Washington, Department of Computer Science, February, 1989, are not uniform, as different processors have different degrees. Furthermore, neither the layered shuffle-exchange computers nor the shuffle-shift shuffle-exchange computers can be customized to match the constraints imposed by three or more levels of the packaging hierarchy.

Hierarchical Interconnection Networks proposed by Dandamudi et al in an article entitled "Hierarchical Interconnection Networks For Multicomputer Systems", published in the IEEE Transactions On Computers, 39(6):786–797, June, 1990, are not uniform because different processors have different degrees, and they are not optimized for implementing algorithms with global communication patterns such as those in the classes Ascend and Descend. Parallel computers which use the hierarchical cubic networks described by K. Ghose et al in an article entitled "The Design and Evaluation Of the Hierarchical Cubic Network", published in the proceedings of the International Conference On Parallel Processing, pages 355–562, 1990 (Volume 1), are not scalable, as the degree of each node grows with the number of processors. The hypernet networks proposed by J. Ghosh et al in an article entitled "Hypernet: A Communication-Efficient Architecture For Constructing Massively Parallel Computers", published in the IEEE Transactions On Computers, C-36(12):1450–1466, December, 1987 have a fixed number of connections with identical bandwidth at each level of the packaging hierarchy, so they cannot be tuned to match arbitrary packaging constraints.

Thus, none of the previously known parallel architectures are simultaneously uniform, scalable, adjustable to arbitrary packaging constraints, and efficient in implementing algorithms with global communication, such as those algorithms in the classes Ascend and Descend.

SUMMARY OF THE INVENTION

Accordingly, it is an object of the invention to provide an efficient manner for connecting and packaging processors in a parallel computer which matches the packaging constraints and which supports the efficient implementation of algorithms with global communication requirements, including those in the classes Ascend and Descend.

It is a further object of the invention to provide uniform and scalable interconnection networks that can be customized to match the packaging constraints.

Still further, given N, the desired number of processors, and given a set of packaging constraints which state the maximum number of components in each level of the packaging hierarchy that can be placed in a single component in the next level of the packaging hierarchy and which state the maximum number of wires that can leave a single component in each level of the packaging hierarchy, it is an object of the invention to provide a means for interconnecting and packaging the processors such that (1) all of the packaging constrains are satisfied, (2) each component in each level of the packaging hierarchy is identical to every other component in the same level, and (3) the components at each level of the packaging hierarchy can be reused to create parallel machines with more processors.

Furthermore, it is an object of the invention to provide an efficient implementation of algorithms with global communication requirements, including those in the classes Ascend and Descend, on the parallel computers that are presented.

According to the invention, two new classes of interconnection networks for single instruction stream/multiple data stream (SIMD) parallel computers (and other types of computers to be discussed hereinafter), are described. The new classes of interconnection networks are referred to herein as the hierarchical shuffle-exchange (HSE) and hierarchical de Bruijn (HdB) networks.

An interconnection network for interconnecting $2^n$ processors, where n is an integer, with each processor being uniquely identifiable by one of the $2^n$ combinations of n bits $(x_{n-1}, \ldots, x_0)$, in a parallel computer which includes $2^{n-m}$ packaging modules, where m is an integer and n>m, comprising: (a) a set of three bidirectional communication links associated with each processor $(x_{n-1}, \ldots, x_0)$, via which each processor $(x_{n-1}, \ldots, x_0)$, is connected to processors $(x_{n-1}, \ldots, x_1, c[x_0])$, $(x_{n-1}, \ldots, x_m, x_{m-2}, \ldots, x_0, x_{m-1})$ and $(x_{n-1}, \ldots, x_m, x_0, x_{m-1}, \ldots, x_1)$ respectively, where "$c[x_i]$" denotes the complement of $x_i$; and (b) a set of two additional bidirectional communication links associated with each processor $(x_{n-1}, \ldots, x_0)$ via which each processor $(x_{n-1}, \ldots, x_0)$ is also connected to processors $(x_{n-m-1}, \ldots, x_0, x_{n-1}, \ldots, x_{n-m})$ and $(x_{m-1}, \ldots, x_0, x_{n-1}, \ldots, x_m)$, is an example of an HSE interconnection network contemplated by the invention.

An interconnection network for interconnecting $2^n$ processors, where n is an integer, with each processor being uniquely identifiable by one of the $2^n$ combinations of n bits $(x_{n-1}, \ldots, x_0)$, in a parallel computer which includes $2^{n-m}$ packaging modules, where m is an integer and n>m, comprising: (a) a first set of four bidirectional communication links associated with each processor $(x_{n-1}, \ldots, x_0)$, via which each processor $(x_{n-1}, \ldots, x_0)$, is connected to processors $(x_{n-1}, \ldots, x_m, x_{m-2}, \ldots, x_0, 0)$, $(x_{n-1}, \ldots, x_m, x_{m-2}, \ldots, x_0, 1)$, $(x_{n-1}, \ldots, x_m, 0, x_{m-1}, \ldots, x_1)$ and $(x_{n-1}, \ldots, x_m, 1, x_{m-1}, \ldots, x_1)$ respectively; and (b) a second set of four bidirectional communication links associated with each processor $(x_{n-1}, \ldots, x_0)$ via which each processor $(x_{n-1}, \ldots, x_0)$ is also connected to processors $(x_{n-m-2}, \ldots, x_0, 0, x_{n-1}, \ldots, x_{n-m})$, $(x_{n-m-2}, \ldots, x_0, 1, x_{n-1}, \ldots, x_{n-m})$, $(x_{m-1}, \ldots, x_0, 0, x_{n-1}, \ldots, x_{m+1})$ and $(x_{m-1}, \ldots, x_0, 1, x_{n-1}, \ldots, x_{m+1})$, is an example of an HdB interconnection network contemplated by the invention.

The new HSE and HdB networks are highly regular and scalable and are thus well suited to VSLI implementation. In addition, they can be adjusted to match any set of packaging constraints. These new networks are also efficient in supporting the execution of a wide range of algorithms on computers whose processors are interconnected via one of the networks fabricated in accordance with the teachings of the invention. Such computers are hereinafter referred to as HSE and HbB computers.

Thus, two further aspects of the invention beyond the new classes of networks themselves are the hierarchical computers that may be constructed using the networks (and packaging techniques) taught hereinafter, and methods for implementing algorithms, in particular Ascend and Descend type algorithms, on HSE and HdB computers.

According to these further aspects of the invention, a preferred embodiment of an HSE computer comprises: (a) $2^n$ processors where n is an integer, where each of the $2^n$ processors is uniquely defined by the n bit representation of an integer in the range of 0 to 2n–1; (b) $2^{n-m}$ packaging modules, where n is an integer and n>m, wherein each of the $2^{n-m}$ packaging modules is uniquely identifiable by the n–m bit representation of an integer in the range of 0 to $2^{n-m}-1$ and each processor $(x_{n-1}, \ldots, x_0)$ is included in packaging module $(x_{n-1}, \ldots, x_m)$; and (c) an HSE interconnection network for interconnecting said $2^n$ processors.

In further accord with the aforementioned further aspects of the invention, a preferred embodiment of an HdB computer comprises: (a) $2^n$ processors where n is an integer, where each of the $2^n$ processors is uniquely defined by the n bit representation of an integer in the range of 0 to $2^n-1$; (b) $2^{n-m}$ packaging modules, where n is an integer and n>m, wherein each of the $2^{n-m}$ packaging modules is uniquely identifiable by the n–m bit representation of an integer in the range of 0 to $2^{n-m}-1$ and each processor $(x_{n-1}, \ldots, x_0)$ is included in packaging module $(x_{n-1}, \ldots, x_m)$; and (c) an HdB interconnection network for interconnecting said $2^n$ processors.

The new HSE and HdB networks are hierarchical structures based on the well known shuffle-exchange and de Bruijn networks, respectively. These new networks provide improved performance in the implementation of Ascend/Descend algorithms when pin limitations are present.

Each level of the hierarchy corresponds to a level of packaging (e.g., the chip level, the board level, or the rack level). Their hierarchical nature allows them to be partitioned into a number of identical components (chips, boards, racks, etc.). The design of these identical components does not depend on the number of processors in the parallel machine, so they can be combined to form arbitrarily large networks. Also, because each level of the hierarchy corresponds to a level of packaging, the widths of the connections at each level of the hierarchy can be matched to the constraints imposed by the corresponding level of packaging. Therefore, these new networks are efficient in implementing a wide range of algorithms.

For example, according to yet another aspect of the invention, methods for implementing an Ascend algorithm on an HSE computer are described. In particular, one embodiment of the invention is directed to a method for implementing an Ascend algorithm having $2^n$ data items, each of which has a unique integer ID in the range of 0 through $2^n-1$, where n is an integer, wherein said Ascend algorithm has n stages, 0 through n–1, and further wherein at each stage i, $0 \leq i < n-1$, processing is performed on each pair of data items with IDs whose binary representation differ only in bit position i, on an Hierarchical Shuffle-Exchange (HSE) computer having $2^n$ processors, each of which has a unique ID in the range of 0 through $2^n-1$ wherein said HSE computer includes $2^{n-m}$ packaging modules, where m is an integer and n>m, comprising the steps of: (a) storing each data item j, where j is an integer in the range from 0 to $2^n-1$, in processor j; (b) performing the first m stages of said Ascend algorithm by utilizing the exchange and local unshuffle connections of said HSE computer; (c) repositioning the data items by utilizing the global unshuffle connections of said HSE computer; and d) repeating steps (b) and (c) until all the n stages of the Ascend algorithm have been completed.

Still further aspects of the invention are directed to methods for implementing an Ascend algorithm on an HdB computer and methods for implementing Descend algorithms on both HSE and HdB computers, are described.

Further yet, the invention contemplates an alternate embodiment of the aforementioned HSE and HdB networks and computers. In particular the invention contemplates what will be referred to hereinafter as Merged HSE (MHSE) and Merged HdB (MHdB) networks and computers. The MHSE and MHdB networks (and computers) differ from the HSE and HbD architectures referred to hereinabove in the global communication links utilized between processors (to be described in detail hereinafter); but otherwise function similarly to the aforementioned HSE and HdB networks and computers in so far as support for Ascend and Descend type algorithms, etc.

The invention features parallel architectures (for example, parallel computers built around an HSE, HdB, MHSE or MHdB network), which are simultaneously uniform, scalable, adjustable to arbitrary packaging constraints, and efficient in implementing algorithms with global communication.

The aforementioned (and other) objects and features of the present invention and the manner of obtaining them will become apparent to those skilled in the art; and the invention itself will be best understood, by reference to the following detailed description read in conjunction with the accompanying Drawing.

DETAILED DESCRIPTION

Figure 1:
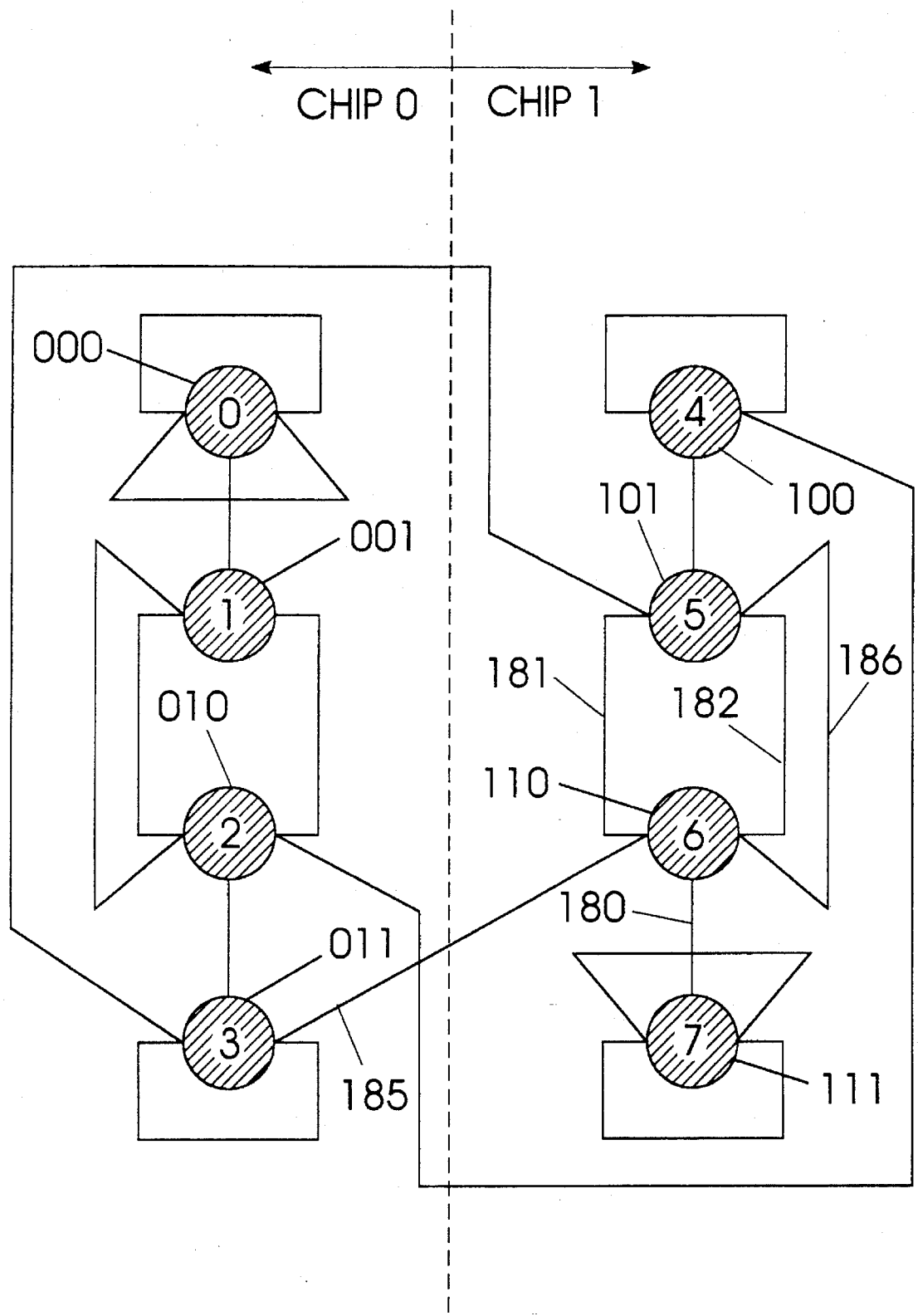
FIG. 1 depicts an illustrative two level HSE computer including 8 processors interconnected via an HSE network, wherein both the HSE network and HSE computer are fabricated in accordance with the teachings of the invention.

Before making reference to the Drawing and proceeding with the detailed description of the invention, the notation used herein, assumptions pertaining to the illustrative architectural models discussed hereinafter, and a brief review of the well known classes of parallel algorithms known as Ascend and Descend algorithms (described in detail in the previously incorporated Preparata, et al reference), will be set forth.

Also, for the sake of completeness, the performance of the HSE and HdB networks with the well known hypercube, 2-D mesh, 3-D mesh, shuffle-exchange, layered shuffle-exchange, hypernet, de Bruijn and cube connected cycles networks, are compared hereinafter (following the description of the networks and computers contemplated by the invention). The HSE and HdB networks (and any computer built around these networks) are shown to have advantages in terms of regularity, scalability and performance.

As for notation, the n-bit binary representation of an integer x will be written as $(x_{n-1}, x_{n-2}, \ldots, x_0)$ and the i-th bit of x, $0 \leq i < n$, will be represented as $x_i$. The complement of the i-th bit of x is $c[x_i]$.

As for the architectural model, the parallel computers described hereinafter are distributed memory architectures in which each processor has an associated local memory and there is no global shared memory. Certain pairs of processors are connected by direct communication links. All communication links are assumed to be bidirectional and half duplex (capable of transmitting in only one direction at a time).

Unless stated otherwise herein, it will also be assumed that each processor can only send data over a single communication link at a time. For the sake of illustration only, the processors will be assumed to operate in a synchronous, SIMD manner.

The algorithms discussed hereinafter, as indicated above, belong to classes of parallel algorithms known as Ascend and Descend algorithms. A large number of parallel algorithms, including the aforementioned FFT, Benes routing, and bitonic sort ( and others such as matrix transpose, monotonic routing, sharesort and parallel prefix operations), are either Ascend or Descend algorithms or are composed entirely of subroutines that are Ascend or Descend algorithms. These operations are all well known and do not constitute a part of the invention per se.

In an Ascend algorithm the data items are viewed as forming a linear array of length V. An Ascend algorithm consists of $\log_2 V$ stages, numbered 0 through $\log_2 V - 1$. During each stage i, processing is performed on each pair of data items in array locations that differ in bit position i. Thus, in stage 0 each data item in an even array location and the data item immediately following it are processed. Successive stages process pairs of data items that are increasingly far apart. The nature of the processing depends on the particular Ascend algorithm that is being implemented. Descend algorithms are identical except that bit positions are processed in the reverse order, from most to least significant.

Ascend and Descend algorithms map very naturally to a hypercube computer. In a hypercube computer with $N=2^n$ processors, the processors are numbered 0 through N-1. Each processor x is connected to the n processors of the form $(x_{n-1}, \ldots, x_{i+1}, c[x_i], x_{i-1}, \ldots, x_0)$ where $0 < i \leq n-1$. Thus an Ascend algorithm with V=N data items can be implemented on a hypercube by storing each item x in processor x. Using this storage pattern, all of the communication occurs between pairs of processors that are connected by communication links.

It is well known to those skilled in the art that Ascend and Descend algorithms also map efficiently to shuffle-exchange, de Bruijn and cube connected cycles networks. In the shuffle-exchange and de Bruijn networks the data items in array locations which differ in bit 0 are initially paired with one another. After performing the processing for bit position 0, the data items are permuted so that they are paired according to bit position 1. Once the processing for bit position 1 is completed, the data items are again permuted so that they are paired according to bit position 2. This pattern is repeated until the processing for all of the bit positions has been completed.

The cube connected cycles network is a leveled network in which each level pairs the data items according to a different bit position. Processing begins by performing calculations for bit position 0 in the level associated with bit position 0. Then the data from this level are shifted to the next level and processing for bit position 1 is performed. The data items that begin in different levels of the network are shifted through the same sequence of levels in a pipelined manner.

Having addressed the notation used herein, the assumptions related to the architectural models used to describe the invention and having reviewed useful classes of algorithms supported by the invention, reference will now be made to the drawing to describe the details of the various aspects of the invention summarized hereinbefore.

First, 2 novel two level hierarchical computers will be described. Each description will be summarized with reference to illustrative examples set forth in FIG. 1 and FIG. 4 of the Drawing. These computers will be seen to include a set of processors interconnected by novel networks.

The novel parallel computers, a two level HSE computer and a two level HdB computer, each have two types of connections; local ones and global ones. HSE and HdB computers with more levels will also be described herein.

The two level computers are designed for packaging technologies which impose strict pin limitations at a single level of the packaging hierarchy (such as at the chip or board level). For ease of discussion, a unit of packaging at this critical level of the packaging hierarchy will be referred to herein as a "chip" but it is important to note that the term "chip" refers to an arbitrary unit of packaging, sometimes referred to herein as a packaging module.

All of the local connections stay within a single chip, and as a result they can be wide connections. The local connections form either a shuffle-exchange or a de Bruijn network of the processors on a chip. The global connections are relatively narrow connections (compared with the aforesaid local connections) that may go between chips.

An Ascend algorithm is implemented by first using the local connections to perform the processing for the bit positions that are local to the chips. Then the global connections are used to bring a new set of bit positions into the chips. This process of alternating between the local and the global connections is repeated until all of the bit positions have been processed. Because the more narrow global connections are used infrequently, an efficient implementation is obtained. A more formal description of the computers and how they are used is set forth hereinafter.

First a two level HSE computer will be described.

A two level HSE computer, 2HSE(n,m,a,b), where n>m and a≦b, includes $2^n$ processors numbered $0, \ldots, 2^n-1$. These processors are placed on $2^{n-m}$ chips, with $2^m$ processors per chip. The chips are numbered $0, \ldots, 2^{n-m}-1$ and each processor $(x_{n-1}, \ldots, x_0)$ is placed on chip $(x_{n-1}, \ldots, x_m)$. Thus, the first n-m bits of a processor number (processor ID) specify its chip number (chip ID), and the remaining m bits specify the processor's role within the chip.

Each processor has 5 bi-directional communication links. Each processor $(x_{n-1}, \ldots, x_0)$ is connected to processors $(x_{n-1}, \ldots, x_1, c[x_0])$, $(x_{n-1}, \ldots, x_m, x_{m-2}, \ldots, x_0, x_{m-1})$ and $(x_{n-1}, \ldots, x_m, x_0, x_{m-1}, \ldots, x_1)$ via the exchange, local shuffle and local unshuffle connections, respectively. All three of these connections are referred to herein as "local connections".

Each processor $(x_{n-1}, \ldots, x_0)$ is also connected to processors $(x_{n-m-1}, \ldots, x_0, x_{n-1}, \ldots, x_{n-m})$ and $(x_{m-1}, \ldots, x_0, x_{n-1}, \ldots, x_m)$, via the global shuffle and global unshuffle connections, respectively. Both of these connections are referred to herein as "global connections". All of the global connections are a bits wide and all of the local connections are b bits wide.

The two level network is comprised of the sets of local and global connections together.

In order to implement an Ascend algorithm with $N=2^n$ data items, the exchange connections are first used to perform the calculations for bit position 0. Then each data item is sent along its local unshuffle connection. At this point each data item $(x_{n-1}, \ldots, x_0)$ is stored in processor $(x_{n-1}, \ldots, x_m, x_0, x_{m-1}, \ldots, x_1)$. Next, the exchange connections are used to perform the calculations for bit position 1. Then each data item is sent along its local unshuffle connection. At this point each data item $(x_{n-1}, \ldots, x_0)$ is stored in processor $(x_{n-1}, \ldots, x_m, x_1, x_0, x_{m-1}, \ldots, x_2)$. This process of using the exchange and local unshuffle connections is repeated m times in order to perform processing for the m least significant bits. Following this procedure, each data item $(x_{n-1}, \ldots, x_o)$ is once again stored in processor $(x_{n-1}, \ldots, x_o)$.

Next, each data item is sent along its global unshuffle connection, so each data item $(x_{n-1}, \ldots, x_0)$ is stored in processor $(x_{m-1}, \ldots, x_0, x_{n-1}, \ldots, x_m)$. Then the above procedure of performing m exchange and local unshuffles is repeated. This completes the processing for bit positions m through 2m−1. At this point each data item $(x_{n-1}, \ldots, x_o)$ is once again stored in processor $(x_{m-1}, \ldots, x_0, x_{n-1}, \ldots, x_m)$. Next, each data item is sent along its global unshuffle connection, so each data item $(x_{n-1}, \ldots, x_o)$ is stored in processor $(x_{2m-1}, \ldots, x_0, x_{n-1}, \ldots, x_{2m})$. The exchange and local unshuffle connections are then used to perform the processing for bit positions 2m through 3m−1. This process of using the global unshuffle connections to place a new set of m bits local to each chip and then using the exchange and local unshuffle connections to perform the processing for those m bits is repeated until all of the n bits have been processed.

When n is a multiple of m, this procedure leaves each data item $(x_{n-1}, \ldots, x_o)$ stored in its original processor $(x_{n-1}, \ldots, x_o)$. For example, Table 1 shows how an Ascend algorithm is implemented on a two-level HSE network when n=9 and m=3. The first column specifies which processor holds an arbitrary data item $(x_8, \ldots, x_0)$ at the beginning of the algorithm and following each local or global unshuffle operation. For each entry in the first column, the corresponding entry in the second column specifies which bit position is processed.

TABLE 1

Implementation of an Ascend algorithm on
a two level HSE network with n = 9 and m = 3.

| Processor: | Bit Processed: |
|---|---|
| $(x_8 x_7 x_6 x_5 x_4 x_3 x_2 x_1 x_0)$ | 0 |
| $(x_8 x_7 x_6 x_5 x_4 x_3 x_0 x_2 x_1)$ | 1 |
| $(x_8 x_7 x_6 x_5 x_4 x_3 x_1 x_0 x_2)$ | 2 |
| $(x_8 x_7 x_6 x_5 x_4 x_3 x_2 x_1 x_0)$ | |
| $(x_2 x_1 x_0 x_8 x_7 x_6 x_5 x_4 x_3)$ | 3 |

TABLE 1-continued

Implementation of an Ascend algorithm on
a two level HSE network with n = 9 and m = 3.

| Processor: | Bit Processed: |
|---|---|
| $(x_2x_1x_0x_8x_7x_6x_3x_5x_4)$ | 4 |
| $(x_2x_1x_0x_8x_7x_6x_4x_3x_5)$ | 5 |
| $(x_2x_1x_0x_8x_7x_6x_5x_4x_3)$ | |
| $(x_5x_4x_3x_2x_1x_0x_8x_7x_6)$ | 6 |
| $(x_5x_4x_3x_2x_1x_0x_6x_8x_7)$ | 7 |
| $(x_5x_4x_3x_2x_1x_0x_7x_6x_8)$ | 8 |
| $(x_5x_4x_3x_2x_1x_0x_8x_7x_6)$ | |
| $(x_8x_7x_6x_5x_4x_3x_2x_1x_0)$ | |

When n is not a multiple of m, the above procedure does not leave each data item in its original position. As a result, a sequence of local shuffle or unshuffle operations must be performed, followed by a sequence of global shuffle operations. For example, Table 2 shows how an Ascend algorithm is implemented on a two level HSE network when n=8 and m=3. Note that following the processing of bit 7, a local shuffle and two global shuffle operations are performed to return each data item to its original position. In general, the shortest sequence of local shuffles or unshuffles, followed by global shuffles, is performed which returns the data items to their original locations. Descend algorithms are implemented in the same manner as Ascend algorithms, but the operations are performed in the reverse order.

FIG. 1 depicts an illustrative two level (i.e., m=2 packaging levels) HSE computer, that includes 8 processors ($2^n$ where n=3) The two levels are illustrated by chips 0 and 1 in FIG. 1, while the 8 processors are shown as processors 000–111 (base 2), i.e., as processors 0–7 (decimal). Thus it can be seen that each of the processors may be uniquely defined by the n bit (i.e., 3 bit) representation of an integer in the range of 0 to $2^n-1$ (i.e., 000, 001, 010, 011, 100, 101, 110 or 111). Furthermore, with reference to FIG. 1, it may be seen that each of the $2^{n-m}$ packaging modules (e.g., the two chips depicted in FIG. 1), is identifiable by the n–m bit (1 bit) representation of an integer in the range of 0 to $2^{n-m}-1$ (i.e., 0 or 1); while each processor $(x_{n-1}, \ldots, x_0)$ is included in packaging module $(x_{n-1}, \ldots, x_m)$, i.e., in the illustrative example, processors 000, 001, 010 and 011 are included in packaging module (chip) 0 and processors 100, 101, 110 and 111 are included in packaging module (chip) 1.

The depicted network for interconnecting the $2^n$ processors shown in FIG. 1 is an HSE interconnection network. Thus, for example, processor 110 may be seen interconnected, via the HSE network (as defined hereinabove) depicted in FIG. 1, to processors 111, 101 and 101, by local links 180, 181, and 182, respectively. It should be noted that in the instance of exemplary processor 110, two local links go to the same processor (101).

Also, the two global links associated with exemplary processor 110 are links 185 and 186, to processors 011 (on chip 0) and again, processor 101 on chip 1. All of the other depicted local and global connections in the HSE computer shown in FIG. 1 are in accord with the definition of a two level HSE computer and network as set forth hereinabove.

Figure 2:
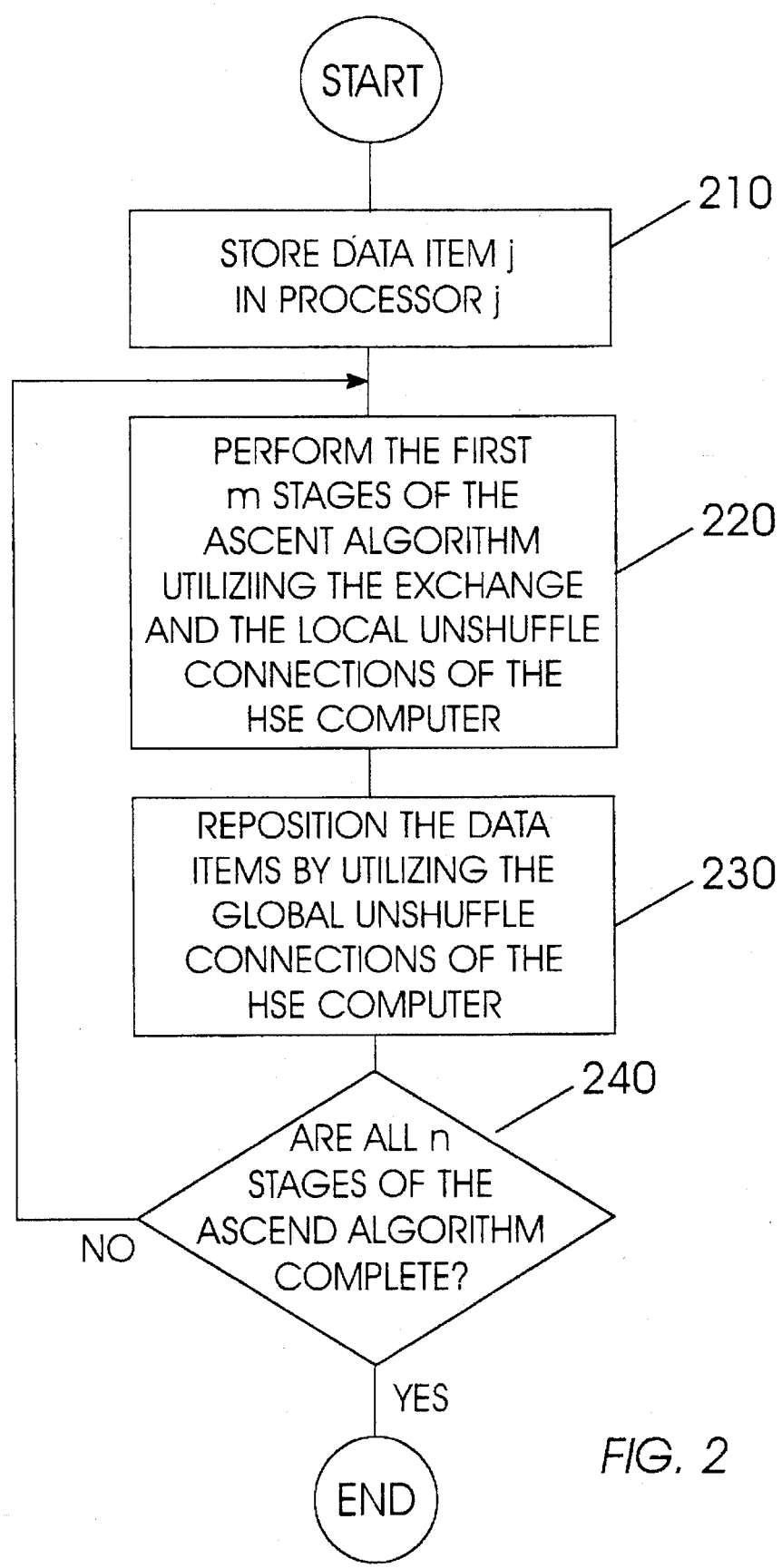
FIG. 2 is a flowchart representation of a set of methods steps contemplated by the invention for implementing an Ascend algorithm on an HSE computer, such as the illustrative HSE computer depicted in FIG. 1.

FIG. 2 is a flowchart representation of a set of methods steps contemplated by the invention for implementing an Ascend algorithm on an HSE computer, such as the illustrative HSE computer depicted in FIG. 1.

In particular, FIG. 2 summarizes the key steps of a method for implementing an Ascend algorithm having $2^n$ data items, each of which has a unique integer ID in the range of 0 through $2^n-1$ where n is an integer, wherein said Ascend algorithm has n stages, 0 through n–1, and further wherein at each stage i, $0 \leq i < n-1$, processing is performed on each pair of data items with IDs whose binary representation differ only in bit position i, on an Hierarchical Shuffle-Exchange (HSE) computer having $2^n$ processors, each of which has a unique ID in the range of 0 through $2^n-1$ wherein said HSE computer includes $2^{n-m}$ packaging modules, where m is an integer and n>m, comprising the steps of: (a) storing each data item j, where j is an integer in the range from 0 to $2^n-1$, in processor j (shown at block 210 of FIG. 2); (b) performing the first m stages of said Ascend algorithm by utilizing the exchange and local unshuffle connections of said HSE computer (shown at block 220 of FIG. 2); (c) repositioning the data items by utilizing the global unshuffle connections of said HSE computer (shown at block 230 of FIG. 2); and (d) repeating steps (b) and (c) until all the n stages of the Ascend algorithm have been completed (shown at block 240 of FIG. 2).

Figure 3:
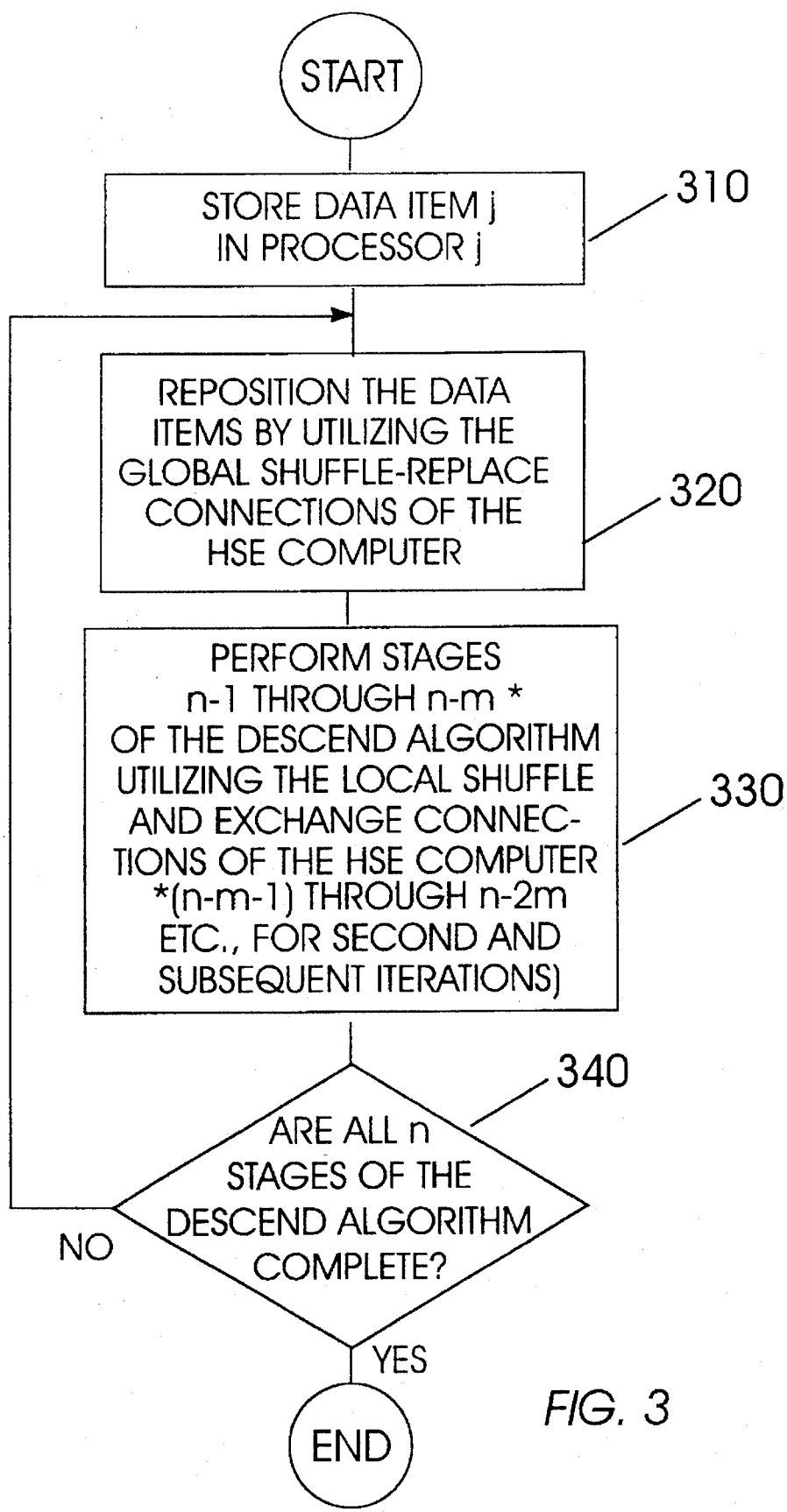
FIG. 3 is a flowchart representation of a set of methods steps contemplated by the invention for implementing a Descend algorithm on an HSE computer, such as the illustrative HSE computer depicted in FIG. 1.

FIG. 3 is a flowchart representation of a set of methods steps contemplated by the invention for implementing a Descend algorithm on an HSE computer, such as the illustrative HSE computer depicted in FIG. 1.

In particular, FIG. 3 summarizes the key steps of a method for implementing a Descend algorithm having $2^n$ data items, each of which has a unique integer ID in the range of 0 through $2^n-1$, where n is an integer, wherein said Descend algorithm has n stages, 0 through n–1, and further wherein at each stage i, $0 \leq i < n-1$, processing is performed on each pair of data items with IDs whose binary representations differ only in bit position i, on an Hierarchical Shuffle-Exchange (HSE) computer having $2^n$ processors, each of which has a unique ID in the range of 0 through $2^n-1$ wherein said HSE computer includes $2^{n-m}$ packaging modules, where m is an integer and n>m, comprising the steps of: (a) storing each data item j, where j is an integer in the range from 0 to $2^n-1$, in processor j (shown at block 310 of FIG. 3); (b) repositioning the data items by utilizing the global shuffle connections of said HSE computer (shown at block 320 of FIG. 3); (c) performing the stages n-1 through n–m of said Descend algorithm by utilizing the local shuffle and exchange connections of said HSE computer (shown at block 330 of FIG. 3); and (d) repeating steps (b) and (c) until all the n stages of the Descend algorithm have been completed (shown at block 340 of FIG. 3).

Next, a two level HdB computer will be described.

A two level HdB computer, 2HdB(n,m,a,b), where n>m and $a \leq b$, consists of $2^n$ processors numbered $0,\ldots,2^n-1$. These processors are placed on $2^{n-m}$ chips, with $2^m$ processors per chip. The chips are numbered $0, \ldots, 2^{n-m}-1$ and each processor $(x_{n-1}, \ldots, x_0)$ is placed on chip $(x_{n-1}, \ldots, x_m)$. Thus the first n-m bits of a processor number specify its chip number and the remaining m bits specify its role within the chip.

TABLE 2

Implementation of an Ascend algorithm on a two-
level HSE network with n = 8 and m = 3.

| Processor: | Bit Processed: |
|---|---|
| $(x_7x_6x_5x_4x_3x_2x_1x_0)$ | 0 |
| $(x_7x_6x_5x_4x_3x_0x_2x_1)$ | 1 |
| $(x_7x_6x_5x_4x_3x_1x_0x_2)$ | 2 |
| $(x_7x_6x_5x_4x_3x_2x_1x_0)$ | |
| $(x_2x_1x_0x_7x_6x_5x_4x_3)$ | 3 |
| $(x_2x_1x_0x_7x_6x_3x_5x_4)$ | 4 |

TABLE 2-continued

Implementation of an Ascend algorithm on a two-level HSE network with n = 8 and m = 3.

| Processor: | Bit Processed: |
|---|---|
| $(x_2x_1x_0x_7x_6x_4x_3x_5)$ | 5 |
| $(x_2x_1x_0x_7x_6x_5x_4x_3)$ | |
| $(x_5x_4x_3x_2x_1x_0x_7x_6)$ | 6 |
| $(x_5x_4x_3x_2x_1x_6x_0x_7)$ | 7 |
| $(x_5x_4x_3x_2x_1x_0x_7x_6)$ | |
| $(x_2x_1x_0x_7x_6x_5x_4x_3)$ | |
| $(x_7x_6x_5x_4x_3x_2x_1x_0)$ | |

Each processor has 8 bi-directional communication links. Each processor $(x_{n-1}, \ldots, x_0)$ is connected to processors $$(x_{n-1}, \ldots, x_m, x_{m-2}, \ldots, x_0, 0)$$

$$(x_{n-1}, \ldots, x_m, x_{m-2}, \ldots, x_0, 1)$$

$$(x_{n-1}, \ldots, x_m, 0, x_{m-1}, \ldots, x_1)$$

and $$(x_{n-1}, \ldots, x_m, 1, x_{m-1}, \ldots, x_1)$$

via the local shuffle-replace-0, local shuffle-replace-1, local unshuffle-replace-0 and local unshuffle-replace-1 connections, respectively. All four of these connections are called local connections. The local (un)shuffle-replace-0 and local (un)shuffle-replace-1 connections are called local (un)shuffle-replace connections. Each processor $(x_{n-1}, \ldots, x_0)$ is also connected to processors $$(x_{n-m-2}, \ldots, x_0, 0, x_{n-1}, \ldots, x_{n-m})$$

$$(x_{n-m-2}, \ldots, x_0, 1, x_{n-1}, \ldots, x_{n-m})$$

$$(x_{m-1}, \ldots, x_0, 0, x_{n-1}, \ldots, x_{m+1})$$

and $$(x_{m-1}, \ldots, x_0, 1, x_{n-1}, \ldots, x_{m+1})$$

via the global shuffle-replace-0, global shuffle-replace-1, global unshuffle-replace-0, and global unshuffle-replace-1, connections, respectively. All four of these connections are called global connections. The global (un)shuffle-replace-0 and global (un)shuffle-replace-1 connections are called global (un)shuffle-replace connections. All of the global connections are a bits wide and all of the local connections are b bits wide.

While the shuffle-exchange and two level HSE computers naturally implement Ascend algorithms with 1 data item per processor, the de Bruijn and two-level HdB computers naturally implement Ascend algorithms with 2 data items per processor. Each processor has two memory locations, numbered 0 and 1, in which its pair of data items is stored. In order to implement an Ascend algorithm with $2N=2^{n+1}$ data items on a two level HdB network with $N=2^n$ processors, each data item $(x_n, \ldots, x_0)$ is initially stored in memory location $x_o$ of processor $(x_n, \ldots, x_1)$. The Ascend algorithm begins by accessing the pair of data items in each processor in order to perform the calculations for bit position 0. Note that no communication is required for this step.

Next, each data item in memory location 0 is sent along its local unshuffle-replace-0 connection and each data item in memory location 1 is sent along its local unshuffle-replace-1 connection. At this point, each data item $(x_n, \ldots, x_0)$ is stored in memory location $x_1$ of processor $(x_n, \ldots, x_{m+1}, x_0, x_m, \ldots, x_2)$. Next, the calculations for bit position 1 are performed by accessing the pair of data items that is local to each processor. Then the local unshuffle-replace connections are used again in order to place each data item $(x_{n-1}, \ldots, x_0)$ in memory location $x_2$ of processor $(x_n, \ldots, x_{m+1}, x_1, x_0, x_m, \ldots, x_3)$. This process of using the local unshuffle-replace connections is repeated m+1 times in order to perform processing for the m+1 least significant bits. Following this procedure, each data item $(x_n, \ldots, x_0)$ is once again stored in memory location $x_0$ of processor $(x_n, \ldots, x_1)$.

Next, each data item in memory location 0 is sent along its global unshuffle-replace-0 connection and each data item in memory location 1 is sent along its global unshuffle-replace-1 connection. At this point, each data item $(x_n, \ldots, x_0)$ is stored in memory location $x_{m+1}$ of processor $(x_m, \ldots, x_0, x_n, \ldots, x_{m+2})$. Then the above procedure of performing m+1 local unshuffle-replaces is repeated. This completes the processing for bit positions m+1 through 2m+1. At this point each data item $(x_n, \ldots, x_0)$ is once again stored in memory location $x_{m+1}$ of processor $(x_m, \ldots, x_0, x_n, \ldots, x_{m+2})$.

Next, each data item is sent along its corresponding global unshuffle-replace connection, so each data item $(x_n, \ldots, x_0)$ is stored in memory location $x_{2m+2}$ of processor $(x_{2m+1}, \ldots, x_0, x_n, \ldots, x_{2m+3})$. Then the above procedure of performing m+1 local unshuffle-replaces is repeated in order to perform the processing for bit positions 2m+2 through 3m+2. This process of using the global unshuffle-replace connections to put a new set of m+1 bits local to each chip and then using the local unshuffle-replace connections to perform the processing for those m+1 bits is repeated until all of the n bits have been processed.

TABLE 3

Implementation of an Ascend algorithm on a two-level HdB network with n = 8 and m = 2.

| Processor: | Memory: | Bit Processed: |
|---|---|---|
| $(x_8x_7x_6x_5x_4x_3x_2x_1)$ | $x_0$ | 0 |
| $(x_8x_7x_6x_5x_4x_3x_0x_2)$ | $x_1$ | 1 |
| $(x_8x_7x_6x_5x_4x_3x_1x_0)$ | $x_2$ | 2 |
| $(x_8x_7x_6x_5x_4x_3x_2x_1)$ | $x_0$ | |
| $(x_2x_1x_0x_8x_7x_6x_5x_4)$ | $x_3$ | 3 |
| $(x_2x_1x_0x_8x_7x_6x_3x_5)$ | $x_4$ | 4 |
| $(x_2x_1x_0x_8x_7x_6x_4x_3)$ | $x_5$ | 5 |
| $(x_2x_1x_0x_8x_7x_6x_5x_4)$ | $x_3$ | |
| $(x_5x_4x_3x_2x_1x_0x_8x_7)$ | $x_6$ | 6 |
| $(x_5x_4x_3x_2x_1x_0x_6x_8)$ | $x_7$ | 7 |
| $(x_5x_4x_3x_2x_1x_0x_7x_6)$ | $x_8$ | 8 |
| $(x_5x_4x_3x_2x_1x_0x_8x_7)$ | $x_6$ | |
| $(x_8x_7x_6x_5x_4x_3x_2x_1)$ | $x_0$ | |

When n+1 is a multiple of m+1, this procedure leaves each data item $(x_n, \ldots, x_0)$ stored in its original memory location $x_0$ of processor $(x_n, \ldots, x_1)$. For example, Table 3 shows how an Ascend algorithm is implemented on a two-level HdB network when n=8 and m=2. The first two columns give the processor and memory location of an arbitrary data item $(x_8, \ldots, x_0)$ at the beginning of the algorithm and following each communication operation. For each entry in the first two columns, the corresponding entry in the third column specifies which bit position is processed.

When n+1 is not a multiple of m+1, the above procedure does not leave each data item in its original position. As a result, a sequence of local shuffle-replace or unshuffle-replace operations must be performed, followed by a sequence of global shuffle-replace operations. For example, Table 4 shows how an Ascend algorithm is implemented on a two-level HdB network when n=7 and m=2. Note that following the processing of bit 7, a local shuffle-replace and two global shuffle-replace operations are performed which return the data items to their original locations. Descend algorithms are implemented in the same manner as Ascend algorithms, but the operations are performed in the reverse order.

Figure 4:
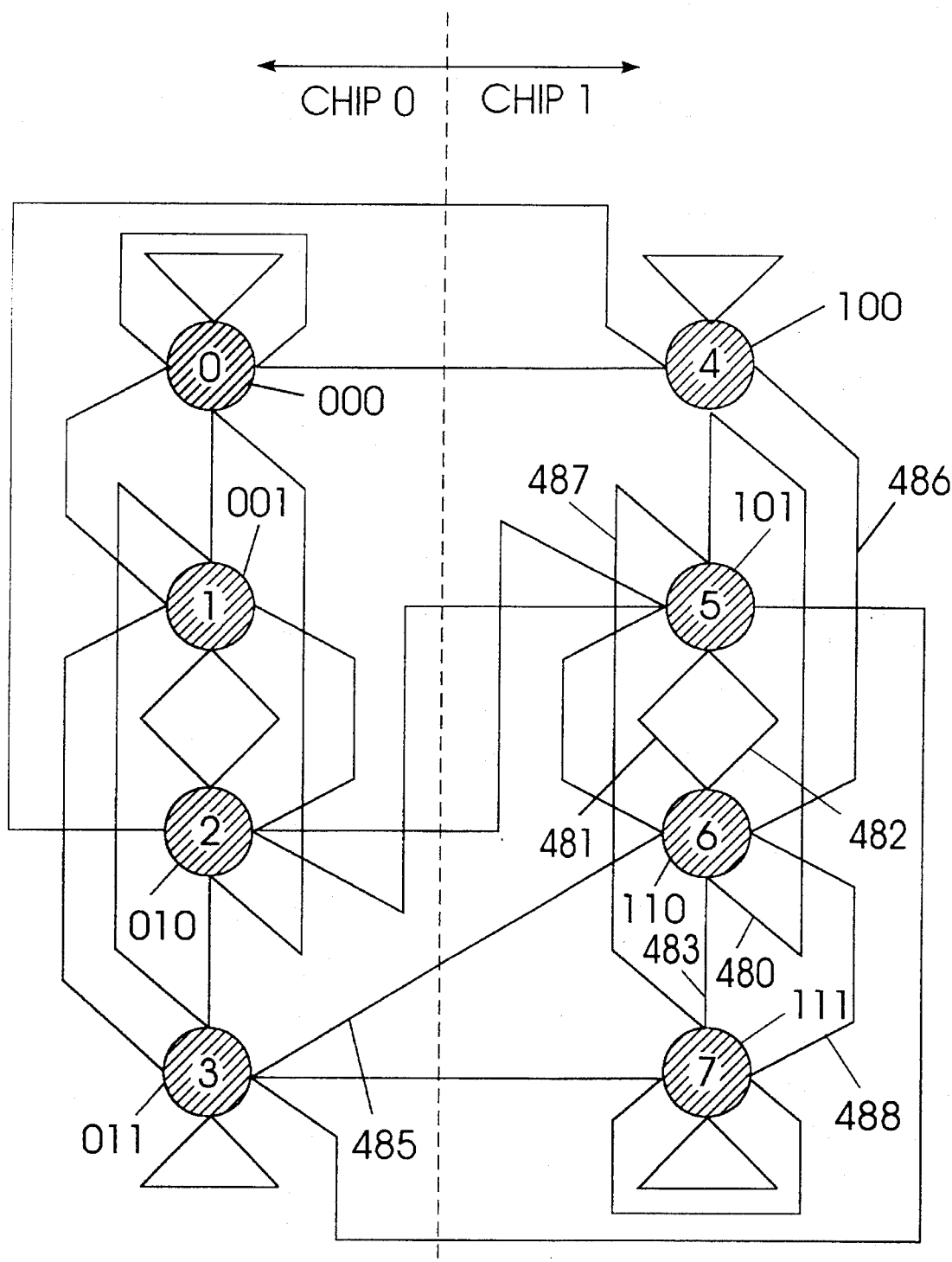
FIG. 4 depicts an illustrative two level HdB computer including 8 processors interconnected via an HdB network, wherein both the HdB network and HdB computer are fabricated in accordance with the teachings of the invention.

FIG. 4 depicts an illustrative two level (i.e., m=2 packaging levels) HdB computer,that includes 8 processors ($2^n$, where n=3). The two levels are illustrated by chips 0 and 1 in FIG. 4, while the 8 processors are again shown as processors 000–111 (base 2), i.e., as processors 0–7 (decimal). Thus it can be seen that each of the processors may be uniquely defined by the n bit (i.e., 3 bit) representation of an integer in the range of 0 to $2^n-1$ (i.e., 000, 001, 010, 011, 100, 101, 110 or 111). Furthermore, with reference to FIG. 4, it may be seen that each of the $2^{n-m}$ packaging modules (e.g., the two chips depicted in FIG. 4), is identifiable by the n-m bit (1 bit) representation of an integer in the range of 0 to $2^{n-m}-1$ (i.e., 0 or 1); while each processor $(x_{n-1}, \ldots, x_0)$ is included in packaging module $(x_{n-1}, \ldots, x_m)$, i.e., in the illustrative example, processors 000, 001, 010 and 011 are included in packaging module (chip) 0 and processors 100, 101, 110 and 111 are included in packaging module (chip) 1.

The depicted network for interconnecting the $2^n$ processors shown in FIG. 4 is an HdB interconnection network as defined hereinbefore. Thus, for example, processor 110 may be seen interconnected, via the depicted HdB network depicted in FIG.2, to processors 100, 101, 101, 111, by local connections (links) 480, 481, 482 and 483, respectively. It should be noted that in the instance of exemplary processor 110, two of the four local links go to the same processor (101).

The four global links associated with exemplary processor 110 are links 485–488, and these links connect processor 110 (on chip 1) to processor 011 on chip 0 and processors 100, 101 and 111 on chip 1, respectively. All of the other depicted local and global connections in the HdB computer shown in FIG. 4, are in accord with the definition of a two level HdB computer and network as set forth hereinabove.

Figure 5:
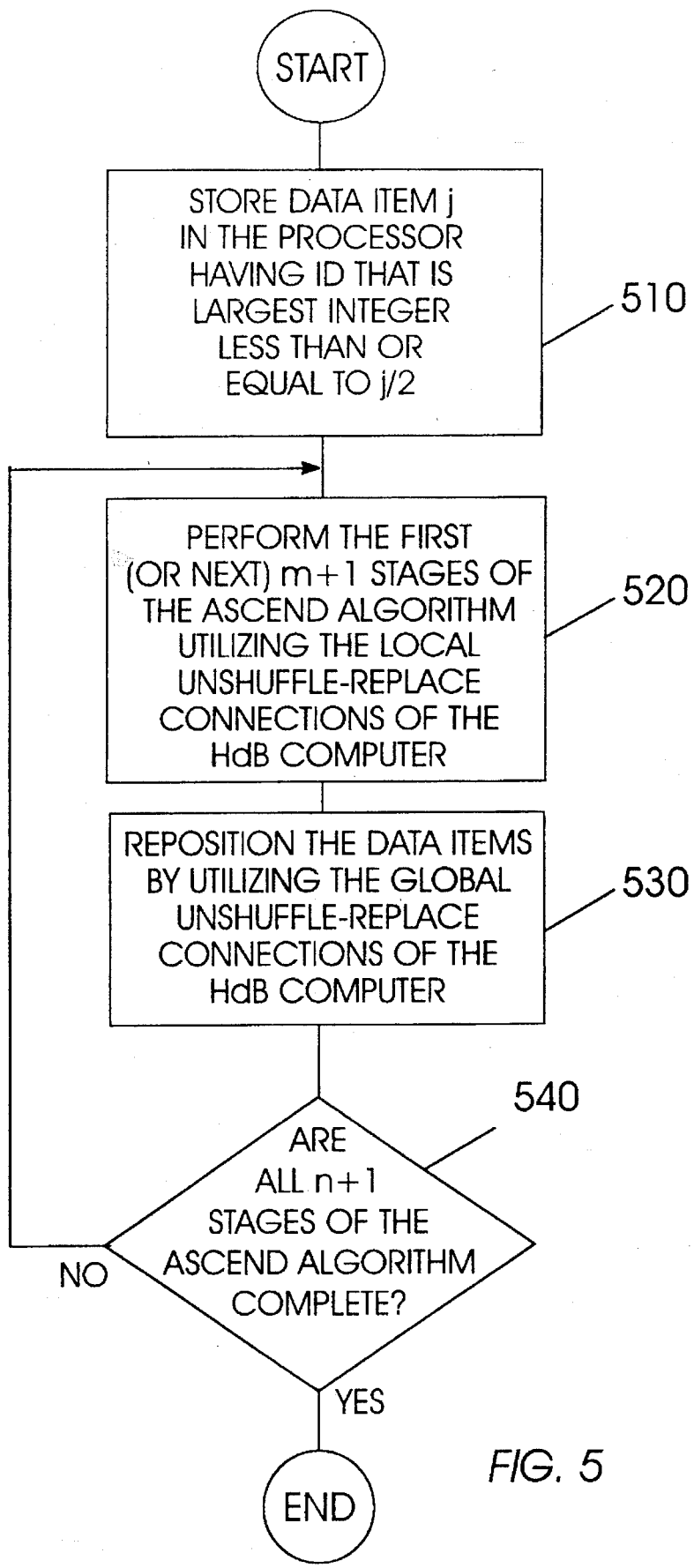
FIG. 5 is a flowchart representation of a set of methods steps contemplated by the invention for implementing an Ascend algorithm on an HdB computer, such as the illustrative HdB computer depicted in FIG. 4.

FIG. 5 is a flowchart representation of a set of methods steps contemplated by the invention for implementing an Ascend algorithm on an HdB computer, such as the illustrative HdB computer depicted in FIG. 4.

In particular, FIG. 5 summarizes the key steps of a method for implementing an Ascend algorithm having $2^{n+1}$ data items, each of which has a unique integer ID in the range of 0 through $2^{n+1}-1$, where n is an integer, wherein said Ascend algorithm has n+1 stages, 0 through n, and further wherein at each stage i, $0 \leq i \leq n$, processing is performed on each pair of data items with IDs whose binary representation differ only in bit position i, on an Hierarchical de Bruijn (HdB) computer having $2^n$ processors, each of which has a unique ID in the range of 0 through $2^n-1$, wherein said HdB computer includes $2^{n-m}$ packaging modules, where m is an integer and n>m, comprising the steps of: (a) storing each data item j, where j is an integer in the range from 0 through $2^{n+1}-1$, in the processor whose ID is the largest integer less than or equal to j/2 (shown at block 510 of FIG. 5); (b) performing the first m+1 stages of said Ascend algorithm by utilizing the local unshuffle-replace connections of said HdB computer (shown at block 520 of FIG. 5); (c) repositioning the data items by utilizing the global unshuffle-replace connections of said HdB computer (shown at block 530 of FIG. 5); and (d) repeating steps (b) and (c) until all the n+1 stages of the Ascend algorithm have been completed (shown at block 540 of FIG. 5).

Figure 6:
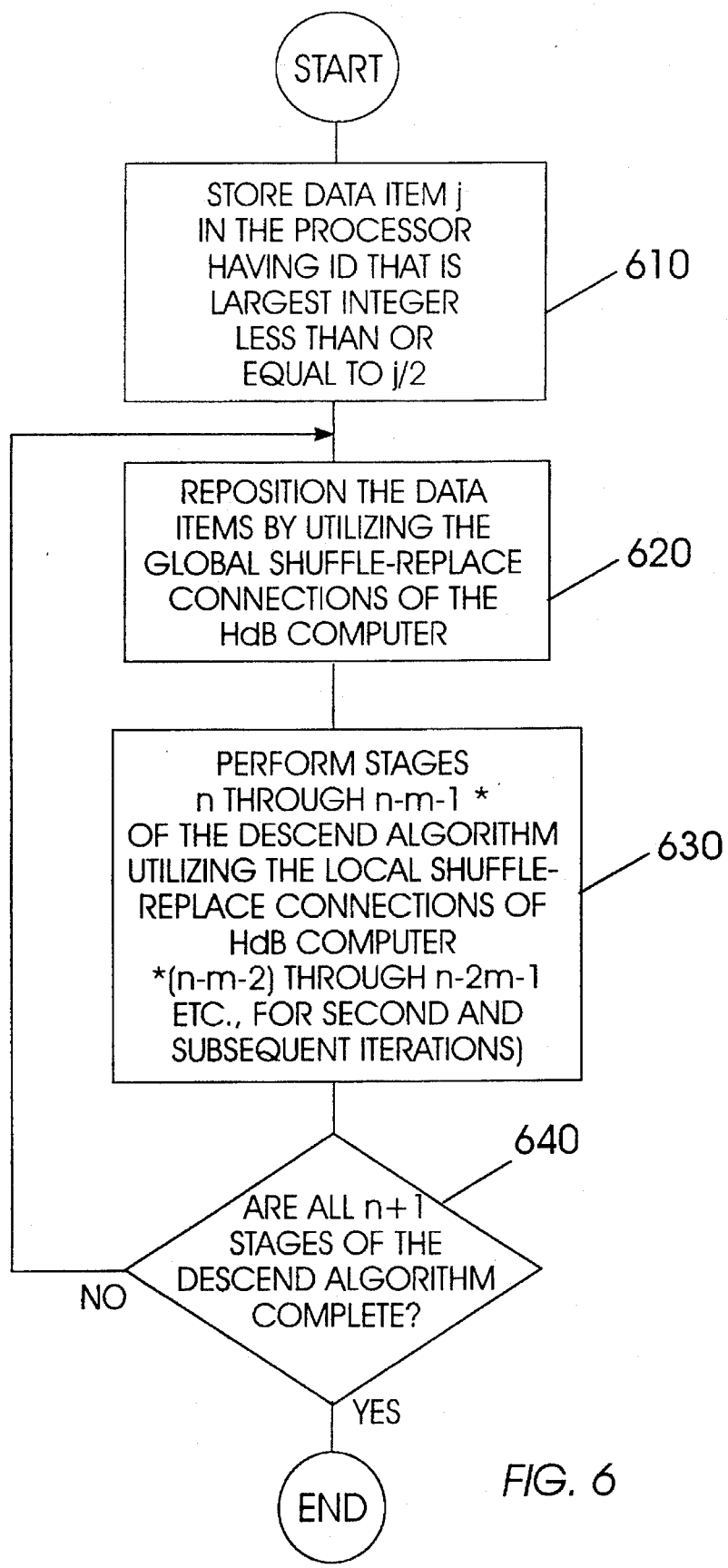
FIG. 6 is a flowchart representation of a set of methods steps contemplated by the invention for implementing a Descend algorithm on an HdB computer, such as the illustrative HdB computer depicted in FIG. 4.

FIG. 6 is a flowchart representation of a set of methods steps contemplated by the invention for implementing a Descend algorithm on an HdB computer, such as the illustrative HdB computer depicted in FIG. 4.

In particular, FIG. 6 summarizes the key steps of a method for implementing an Ascend algorithm having $2^{n+1}$ data items, each of which has a unique integer ID in the range of 0 through $2^{n+1}-1$ where n is an integer, wherein said Descend algorithm has n+1 stages, 0 through n, and further wherein at each stage i, $0 \leq i \leq n$, processing is performed on each pair of data items with IDs whose binary representation differ only in bit position i, on an Hierarchical de Bruijn (HdB) computer having $2^n$ processors, each of which has a unique ID in the range of 0 through $2^n-1$, wherein said HdB computer includes $2^{n-m}$ packaging modules, where m is an integer and n>m, comprising the steps of: (a) storing each data item j, where j is an integer in the range from 0 to $2^{n+1}-1$, in the processor whose ID is the largest integer less than or equal to j/2 (shown at block 610 of FIG. 6); (b) repositioning the data items by utilizing the global shuffle-replace connections of said HdB computer (shown at block 620 of FIG. 6); (c) performing stages n through n-m-1 of said Descend algorithm by utilizing the local shuffle-replace connections of said HdB computer (shown at block 630 of FIG. 6); and (d) repeating steps (b) and (c) until all the n+1 stages of the Descend algorithm have been completed (shown at block 640 of FIG. 6).

TABLE 4

Implementation of an Ascend algorithm on a two-level HdB network with n = 7 and m = 2.

| Processor: | Memory: | Bit Processed: |
|---|---|---|
| $(x_7x_6x_5x_4x_3x_2x_1)$ | $x_0$ | 0 |
| $(x_7x_6x_5x_4x_3x_0x_2)$ | $x_1$ | 1 |
| $(x_7x_6x_5x_4x_3x_1x_0)$ | $x_2$ | 2 |
| $(x_7x_6x_5x_4x_3x_2x_1)$ | $x_0$ | |
| $(x_2x_1x_0x_7x_6x_5x_4)$ | $x_3$ | 3 |
| $(x_2x_1x_0x_7x_6x_3x_5)$ | $x_4$ | 4 |
| $(x_2x_1x_0x_7x_6x_4x_3)$ | $x_5$ | 5 |
| $(x_2x_1x_0x_7x_6x_5x_4)$ | $x_3$ | |
| $(x_5x_4x_3x_2x_1x_0x_7)$ | $x_6$ | 6 |
| $(x_5x_4x_3x_2x_1x_6x_0)$ | $x_7$ | 7 |
| $(x_5x_4x_3x_2x_1x_0x_7)$ | $x_6$ | |
| $(x_2x_1x_0x_7x_6x_5x_4)$ | $x_3$ | |
| $(x_7x_6x_5x_4x_3x_2x_1)$ | $x_0$ | |

According to further aspects of the invention the above described two-level HSE and HdB computers (and networks) may be extended to architectures having more than two levels, and to slightly modified computers (and networks) which can be made to operate more efficiently in certain circumstances.

Three level architectures contemplated by the invention, and their extension to x level architectures, will be described first, followed by a description of the modified systems.

The three-level HSE and HdB computers (and included networks) are designed for packaging technologies that present strict pin limitations at two levels of the packaging hierarchy. For ease of discussion a unit of packaging at these critical levels of the packaging hierarchy will be referred to hereinafter as a "chip" and a "board", respectively; but it is important to note that these terms refer to arbitrary units of packaging.

The three-level shuffle-exchange and de Bruijn computers include three types of connections, namely local, intermediate and global ones. The local connections are wider than the intermediate connections which in turn are wider than the global connections. Local connections connect processors on the same chip, intermediate connections can be used to connect processors on different chips that are on the same board, and global connections can be used to join processors from different boards.

The processors on each board of a three-level HSE computer are connected using a two-level HSE network. The processors on each board of a three-level HdB computer are connected using a two-level HdB network. The intermediate and local connections of the three-level computer (network portion) correspond to the global and local connections of the two-level, network. The global connections in the three-level computer (network portion) are identical to the global connections in a two-level computer that has as many processors per chip as the three-level computer has per board.

More formally, a three-level HSE computer, 3HSE(n,m, k,a,b,c), where n>m>k and a≦b≦c, consists of $2^n$ processors numbered $0, \ldots, 2^n-1$. These processors are placed on $2^{n-k}$ chips, with $2^k$ processors per chip. The chips are numbered $0, \ldots, 2^{n-k}-1$ and each processor $(x_{n-1}, \ldots, x_0)$ is placed on chip $(x_{n-1}, \ldots, x_k)$. These chips are placed on $2^{n-m}$ boards, with $2^{m-k}$ chips per board. The boards are numbered $0, \ldots, 2^{n-m}-1$ and each chip $(x_{n-k-1}, \ldots, x_0)$ is placed on board $(x_{n-k-1}, \ldots, x_{m-k})$. Thus the first n-m bits of a processor number specify its board number, the next m-k bits specify its chip number within the board, and the remaining k bits specify its role within the chip.

Each processor in a three-level HSE computer has 7 bidirectional communication links. Each processor $(x_{n-1}, \ldots, x_0)$ is connected to processors $(x_{n-1}, \ldots, x_1, c[x_0])$ $(x_{n-1}, \ldots, x_k, x_{k-2}, \ldots, x_0, x_{k-1})$ and $(x_{n-1}, \ldots, x_k, x_0, x_{k-1}, \ldots, x_1)$ via local connections that are each c bits wide. Each processor $(x_{n-1}, \ldots, x_0)$ is also connected to processors $(x_{n-1}, \ldots, x_m, x_{m-k-1}, \ldots, x_0, x_{m-1}, \ldots, x_{m-k})$ and $(x_{n-1}, \ldots, x_m, x_{k-1}, \ldots, x_0, x_{m-1}, \ldots, x_k)$ via intermediate connections that are each b bits wide. Finally, each processor $(x_{n-1}, \ldots, x_0)$ is also connected to processors $(x_{n-m-1}, \ldots, x_0, x_{n-1}, \ldots, x_{n-m})$ and $(x_{m-1}, \ldots, x_0, x_{n-1}, \ldots, x_m)$ via global connections that are each a bits wide.

A three-level HdB computer, 3HdB(n,m,k,a,b,c), where n>m>k and a≦b≦c, consists of $2^n$ processors numbered $0, \ldots, 2^n-1$. These processors are placed $2^k$ per chip and $2^m$ per board according to the same rules as were given for the three-level HSE network, above.

Each processor in a three-level HdB computer has bidirectional communication links. Each processor $(x_{n-1}, \ldots, x_0)$ is connected to processors $(x_{n-1}, \ldots, x_k, x_{k-2}, \ldots, x_0, 0)$ $x_{n-1}, \ldots, x_k, x_{k-2}, \ldots, x_0, 1)$ $x_{n-1}, \ldots, x_k, 0, x_{k-1}, \ldots, x_1)$ and $(x_{n-1}, \ldots, x_k, 1, x_{k-1}, \ldots, x_1)$ via local connections that are each c bits wide. Each $(x_{n-1}, \ldots, x_0)$ is also connected to processors $(x_{n-1}, \ldots, x_m, x_{m-k-2}, \ldots, x_0, 0, x_{m-1}, \ldots, x_{m-k})$ $(x_{n-1}, \ldots, x_m, x_{m-k-2}, \ldots, x_0, 1, x_{m-1}, \ldots, x_{m-k})$ $(x_{n-1}, \ldots, x_m, x_{k-1}, \ldots, x_0, 0, x_{m-1}, \ldots, x_{k-1})$ and $(x_{n-1}, \ldots, x_m, x_{k-1}, \ldots, x_0, 1, x_{m-1}, \ldots, x_{k+1})$ via intermediate connections that are each b bits wide. Finally, each processor $(x_{n-1}, \ldots, x_0)$ is also connected to processors $(x_{n-m-2}, \ldots, x_0, 0, x_{n-1}, \ldots, x_{n-m})$ $(x_{n-m-2}, \ldots, x_0, 1, x_{n-1}, \ldots, x_{n-m})$ $(x_{m-1}, \ldots, x_0, 0, x_{n-1}, \ldots, x_{m+1})$ and $(x_{m-1}, \ldots, x_0, 1, x_{n-1}, \ldots, x_{m+1})$ via global connections that are each a bits wide.

Ascend algorithms are implemented on these three-level computers by first using the intermediate and local connections as if they were two-level networks. Then the global connections are used to move a new set of bits into each board. This process of using the intermediate and local connections to perform the processing for all of the bits that are local to the boards and then using the global connections to move a new set of bit positions into each board is repeated until all of the bit positions have been processed.

Those skilled in the art will readily appreciate that it is possible to define networks and computers analogous to the above described three level architectures, having four or more levels. Each computer with x levels is composed of computers and networks having x-1 levels plus a set of global connections. These global connections are identical to the global connections in a two-level computer that has as many processors per chip as the x-level computer has per its highest level of packaging.

As indicated hereinabove, it is possible to make a small modification to the above described computers and networks to improve their performance in many cases.

By way of example, assume a two-level HSE computer is defined in which n is a multiple of m. When an Ascend algorithm is implemented on this computer, each global unshuffle operation is preceded by a local unshuffle operation whose only purpose is to restore the m least significant bits to their original order. This local unshuffle operation can be eliminated if the global connection performs a local unshuffle followed by a global unshuffle.

To be specific, connections that go from each processor $(x_{n-1}, \ldots, x_0)$ to processor $(x_0, x_{m-1}, \ldots, x_1, x_{n-1}, \ldots, x_m)$ replace the global unshuffle connections. Similarly, connections that go from each processor $(x_{n-1}, \ldots, x_0)$ to processor $(x_{n-m-1}, \ldots, x_0, x_{n-2}, \ldots, x_{n-m}, x_{n-1})$ replace the global shuffle connections. The resulting computer is referred to herein as a two-level Merged HSE (MHSE) computer. An analogous modification can be made to the two-level HdB computer to obtain Merged HdB (MHdB) computers and to hierarchical computers (and networks) with more than two levels.

Having described the various aspects of the invention which meet all of the objectives set forth hereinbefore, a comparison of the performance of the two-level HSE and HdB topologies with previously known topologies will now, as indicated hereinbefore, be set forth for the sake of completeness.

In order to make a fair comparison, it will be assumed that a common set of packaging constraints for all of the topologies exists. The performance of an Ascend algorithm will be set forth.

As was described hereinabove, in an Ascend algorithm the bit positions are accessed in order from least to most significant. For each bit position, the data items in locations which differ in the given bit position are paired together. A calculation is then performed on each of these pairs of data items. It will also be assumed, for the sake of the illustrative comparison being made herein, that this calculation produces two outputs, so bidirectional communication is required. This is the case in many Ascend and Descend algorithms, including the bitonic merge, FFT and Benes routing.

The Ascend algorithm will operate on an array of $N=2^n$ items. Most of the computers implement Ascend algorithms by storing 1 data item in each processor. However, the de Bruijn and HdB computers implement Ascend algorithms by storing a pair of data items in each processor. As a result, we assume that the de Bruijn and HdB computers contain only N/2 processors, while the remaining computers each contain N processors.

In order to normalize the communication times for these computers, it will be assumed that each processor in a de Bruijn and HdB computer can transmit 2 data items simultaneously, while each processor in one of the other computers can only transmit 1 data item at a time. These assumptions allow as many as all N of the data items to be transmitted at one time in each of the computers.

The parameter M will give the maximum number of processors that can be placed on a single chip. When the de Bruijn and HdB computers (networks) are used, it will be assumed that each chip contains M/2 processors. For all of the other computers, it will be assumed that there are M processors per chip. This will result in parallel computers which consist of N/M chips in all cases.

Furthermore, it will be assumed that the processors have a 32-bit word-size and that all on-chip communication links are 32 bits wide. It will also be assumed that the Ascend algorithm is operating on 32 bit data items. The parameter P will represent the maximum number of pins per chip that can be used for communication links. The topology dependent parameter Q will represent the number of communication links that leave each chip, assuming a regular chip design. The dependent parameter W gives the width of the off-chip links. When $Q \leq P/32, W=32$. When $Q > P/32$, W is the largest integer less than or equal to P/Q.

The layered shuffle-exchange will consist of a shuffle-exchange network of size M on each chip, with the corresponding processors on different chips being connected in a cycle. The hypernet will consist of a hypercube of size M on each chip, and the minimum number of levels of hierarchical connections. Hypernets with sizes other than those given by the complete set of hierarchical connections are constructed as incomplete hypernets, as described in the aforementioned Ghosh et al article.

All of the parallel machines will be assumed to operate in a synchronous, SIMD manner. Only the time required for communication will be considered, as the time required for performing calculations is identical for all of the topologies. Details of how these times were derived are set forth hereinafter.

The first illustrative case considered is when M=16 and P=256 (see Table 5). Each row of Table 5 lists the time required to perform the communication for an Ascend algorithm on a different topology. The topologies compared are the layered shuffle-exchange, 2-dimensional mesh, 3-dimensional mesh, hypercube, cube-connected cycles, shuffle-exchange, de Bruijn, hypernet, two-level HSE and two-level HdB. Each column corresponds to a given value of the parameter $n=\log_2 N$. It should be recalled that N data items are being processed, and that the de Bruijn and HdB networks have N/2 processors each, while the remaining networks have N processors each.

Those skilled in the art will readily appreciate that the layered shuffle-exchange is not a competitive network for the given set of parameters. For each value of n it is the slowest network, and it is over 60 times slower than all of the other topologies when n=20. This is to be expected because the length of the cycles connecting the chips grows linearly in N. This topology was originally defined for a very small number of chips, in which case its performance is competitive. The performance of the layered shuffle-exchange could be improved somewhat by using smaller shuffle-exchanges within each chip. This would increase the width of the off-chip connections. However, the other topologies would still be faster in most cases.

TABLE 5

Time required for an Ascend algorithm when M = 16 and P = 256. Values of n are given in the first row.

| n: | 10 | 12 | 14 | 16 | 18 | 20 |
|---|---|---|---|---|---|---|
| LSE: | 388 | 1,540 | 6,148 | 24,580 | 98,308 | 393,220 |
| 2DM: | 172 | 364 | 748 | 1,516 | 3,052 | 6,124 |
| 3DM: | 202 | 346 | 634 | 1,066 | 1,642 | 2,794 |
| HC: | 200 | 264 | 648 | 776 | 904 | 1,032 |
| CCC: | 110 | 113 | 226 | 230 | 230 | 234 |
| SE: | 60 | 72 | 84 | 96 | 108 | 120 |
| dB: | 40 | 48 | 56 | 64 | 72 | 80 |
| HN: | 68 | 72 | 172 | 176 | 196 | 200 |
| 2HSE: | 48 | 48 | 66 | 64 | 86 | 80 |
| 2HdB: | 26 | 24 | 38 | 32 | 50 | 40 |

The next slowest topologies are the 2 and 3 dimensional meshes and the hypercube. Within these three topologies, the higher dimensional structures (the hypercube and the 3 dimensional mesh) generally perform better because of their smaller diameter. However, this trend is weakened by the increased values of Q for the higher dimensional networks.

The hypercube derived networks and the hierarchical networks are always the fastest. The cube-connected cycles is the slowest of these networks, due to the time required for the processing within the cycles. The shuffle-exchange is considerably faster, and the de Bruijn network is an additional 1.5 faster times faster than the shuffle-exchange. The de Bruijn network is more efficient than the shuffle-exchange because it does not require the exchange operations to bring the pairs of data items together in a single processor. The hypernet is never faster than the shuffle-exchange, and in many cases it is slower. In all cases, the HSE and HdB networks are faster than the hypernet.

The HSE and HdB networks are significantly faster than the non-hierarchical networks on which they are based. In particular, the HdB network is always the fastest, and in many cases it is twice as fast as all of the other networks of course the de Bruijn and HdB networks have half as many processors as the other networks and can transmit 2 data items at a time, so they represent a fundamentally different type of architecture.

TABLE 6

T time required for an Ascend algorithm when M = 256 and P = 4,096. Values of n are given in the first row.

| n: | 10 | 12 | 14 | 16 | 18 | 20 |
|---|---|---|---|---|---|---|
| LSE: | 40 | 112 | 400 | 1,552 | 6,160 | 24,592 |
| 2DM: | 92 | 94 | 380 | 764 | 1,532 | 3,068 |
| 3DM: | 54 | 98 | 194 | 338 | 530 | 914 |
| HC: | 32 | 80 | 208 | 272 | 656 | 784 |
| CCC: | 54 | 108 | 110 | 112 | 114 | 232 |
| SE: | 60 | 72 | 84 | 96 | 108 | 120 |
| dB: | 40 | 48 | 56 | 64 | 72 | 80 |
| HN: | 28 | 32 | 36 | 80 | 84 | 88 |
| 2HSE: | 38 | 46 | 52 | 56 | 70 | 78 |
| 2HdB: | 18 | 22 | 24 | 24 | 34 | 38 |

The next illustrative case considered is when M=256 and P=4,096 (see Table 6). These parameters yield very similar results to the previous set of parameters. The hypernet is faster than the HSE for small values of n, but slower than the HSE for larger values of n. Again, the HSE and HdB networks are significantly faster than the non-hierarchical networks on which they are based. The HdB network is the fastest network in every case.

The final illustrative set of parameters considered is when M=256 and P=1,024 (see Table 7). These parameters also yield similar results. However, the smaller value of P favors networks which perform few off-chip communications. In particular, the HdB network is the fastest in all of the cases. With these parameters, the HSE is approximately 2 to 3 times as fast as the de Bruijn network. The hypernet's lack of flexibility is shown clearly in this table. Although it performs well for small values of n, as soon as an additional level of the hierarchy is required (when n≧16), the performance decreases dramatically. When n≧14, the hypercube cannot be built with these parameters, as the off-chip communication links would have to be less than 1 bit wide.

TABLE 7

Time required for an Ascend algorithm when M = 256 and P = 1,024. Values of n are given in the first row.

| n: | 10 | 12 | 14 | 16 | 18 | 20 |
|---|---|---|---|---|---|---|
| LSE: | 88 | 376 | 1,528 | 6,136 | 24,568 | 98,296 |
| 2DM: | 124 | 128 | 700 | 1,468 | 3,004 | 6,076 |
| 3DM: | 126 | 290 | 674 | 1,250 | 2,018 | 3,554 |
| HC: | 80 | 272 | *** | *** | *** | *** |
| CCC: | 72 | 162 | 164 | 448 | 452 | 928 |
| SE: | 180 | 216 | 252 | 288 | 324 | 360 |
| dB: | 160 | 192 | 224 | 256 | 288 | 320 |
| HN: | 52 | 56 | 60 | 224 | 228 | 232 |
| 2HSE: | 62 | 70 | 76 | 80 | 118 | 126 |
| 2HdB: | 42 | 46 | 48 | 48 | 82 | 86 |

The calculations by which the running times presented in Tables 5, 6 and 7 were obtained are set forth hereinafter. For each set of parameters and for each topology, the values of Q and W are first calculated. Then the dependent parameter R, which is the smallest integer greater than or equal to 32/W, is calculated to give the number of cycles required to send a single 32-bit word through an off-chip link. The values of Q, W and R for all of the networks other than the hypercube and cube-connected cycles are given in Tables 8, 9 and 10. These values of Q, W and R are independent of n. Each chip in the 2 (3) dimensional meshes contains a nearly square (cubical) block of processors, where the sides of the block are powers of 2 in length. These blocks do not have wrap-around connections within the chip, so that they can be used in machines of arbitrary size. The shuffle-exchange is partitioned so that the exchange connections are on-chip and the shuffle and unshuffle connections are off-chip. All connections in the de Bruijn network go off-chip. All of the processors on each chip in the hypernet form a "cubelet". Each processor in the hypernet has 1 off-chip connection (as is required for a scalable design) and partial hypernets are constructed as described in the aforementioned Ghosh et al reference. Although Ghosh et al assign one I/O link per cubelet, all links may be viewed as communication links in order to make the hypernet competitive. For a given value of M, the partitions used to obtain the values of Q in Tables 8 through 10 yield a single type of chip that can be used for any value of n.

TABLE 8

Values of Q, W and R when M = 16 and P = 256.

|  | Q | W | R |
|---|---|---|---|
| LSE: | 32 | 8 | 4 |
| 2DM: | 16 | 16 | 2 |
| 3DM: | 40 | 6 | 6 |
| SE: | 32 | 8 | 8 |
| dB: | 32 | 8 | 8 |
| HN: | 15 | 16 | 2 |
| 2HSE: | 32 | 8 | 8 |
| 2HdB: | 32 | 8 | 8 |

TABLE 9

Values of Q, W and R when M = 256 and P = 4,096.

|  | Q | W | R |
|---|---|---|---|
| LSE: | 512 | 8 | 4 |
| 2DM: | 64 | 32 | 1 |
| 3DM: | 256 | 16 | 2 |
| SE: | 512 | 8 | 8 |
| dB: | 512 | 8 | 8 |
| HN: | 255 | 16 | 2 |
| 2HSE: | 512 | 8 | 8 |
| 2HdB: | 512 | 8 | 8 |

TABLE 10

Values of Q, W and R when M = 256 and P = 1,024.

|  | Q | W | R |
|---|---|---|---|
| LSE: | 512 | 2 | 16 |
| 2DM: | 64 | 16 | 2 |
| 3DM: | 256 | 4 | 8 |
| SE: | 512 | 2 | 16 |
| dB: | 512 | 2 | 16 |
| HN: | 255 | 4 | 8 |
| 2HSE: | 512 | 2 | 16 |
| 2HdB: | 512 | 2 | 16 |

TABLE 11

Values of Q when M = 16. Values of n are given in the first row.

| n: | 10 | 12 | 14 | 16 | 18 | 20 |
|---|---|---|---|---|---|---|
| HC: | 96 | 128 | 160 | 194 | 224 | 256 |
| CCC: | 16 | 8 | 12 | 12 | 16 | 16 |

TABLE 12

Values of Q when M = 256. Values of n are given in the first row.

| n:   | 10  | 12    | 14    | 16    | 18    | 20    |
|------|-----|-------|-------|-------|-------|-------|
| HC:  | 512 | 1,024 | 1,536 | 2,048 | 2,560 | 3,072 |
| CCC: | 64  | 64    | 64    | 96    | 128   | 160   |

For the hypercube and the cube-connected cycles, the parameters Q, W and R depend on n. The values of Q for different values of n are given in Tables 11 and 12. The hypercube is partitioned so that each chip forms a subcube of lower dimension. When M=16, the cube-connected cycles is partitioned into 4 by 4 arrays.

The processors in each row of the array form part of a cycle in the overall topology, so they are connected in a linear array with off-chip connections at the start and end of the linear array. Lateral connections are implemented as vertical connections either within or between chips. Each chip can have up to 2 vertical connections that remain within the chip. When M=256, a similar partition into 32 by 8 arrays is used. At most 5 of the 8 columns can have vertical connections that remain within the chip. When some of the columns in a chip do not require vertical connections, the columns without vertical connections are chosen to be the last columns in the chip. This improves the running time slightly in some cases. For both the hypercube and the cube-connected cycles, for given values of M and n, only one type of chip is required. However, for a given value of M and different values of n, different chips are required.

Each implementation of an Ascend algorithm on one of the given topologies consists of a number of communications across on-chip links and a number of communications across off-chip links. The parameters F (for "fast" and S (for "slow") give the number of on-chip and off-chip communications, respectively. The time required for an Ascend algorithm is then given by the expression F+RS. The values of F and S are given in Tables 13, 14, 15 and 16. Note that these values do not depend on P. For the hypernet, the values of S reflect the fact that certain off-chip connections must be shared by multiple processors.

A problem that arises many times in calculating the values in Tables 13 through 16 is the number of operations required to perform an Ascend algorithm on a linear or circular array. An Ascend algorithm on a linear array of length $2^n$ requires $2^{n+1}-2$ communication operations. An Ascend algorithm on a circular array of length $2^n$ requires $3(2^{n-1})-2$ communication operations.

TABLE 13

Values of F for an Ascend algorithm when M = 16. Values of n are given in the first row.

| n:    | 10 | 12 | 14 | 16 | 18 | 20 |
|-------|----|----|----|----|----|----|
| LSE:  | 12 | 12 | 12 | 12 | 12 | 12 |
| 2DM:  | 12 | 12 | 12 | 12 | 12 | 12 |
| 3DM:  | 10 | 10 | 10 | 10 | 10 | 10 |
| HC:   | 8  | 8  | 8  | 8  | 8  | 8  |
| CCC:  | 0  | 0  | 0  | 0  | 0  | 0  |
| SE:   | 20 | 24 | 28 | 32 | 36 | 40 |
| dB:   | 0  | 0  | 0  | 0  | 0  | 0  |
| HN:   | 20 | 24 | 28 | 32 | 36 | 40 |
| 2HSE: | 30 | 36 | 42 | 48 | 54 | 60 |
| 2HdB: | 10 | 12 | 14 | 16 | 18 | 20 |

TABLE 14

Values of S for an Ascend algorithm when M = 16. Values of n are given in the first row.

| n:    | 10 | 12  | 14    | 16    | 18     | 20     |
|-------|----|-----|-------|-------|--------|--------|
| LSE:  | 94 | 382 | 1,534 | 6,142 | 24,574 | 98,302 |
| 2DM:  | 80 | 176 | 368   | 752   | 1,520  | 3,056  |
| 3DM:  | 32 | 56  | 104   | 176   | 272    | 464    |
| HC:   | 12 | 16  | 20    | 24    | 28     | 32     |
| CCC:  | 55 | 113 | 113   | 115   | 115    | 117    |
| SE:   | 10 | 12  | 14    | 16    | 18     | 20     |
| dB:   | 10 | 12  | 14    | 16    | 18     | 20     |
| HN:   | 24 | 24  | 72    | 72    | 80     | 80     |
| 2HSE: | 4  | 3   | 6     | 4     | 8      | 5      |
| 2HdB: | 4  | 3   | 6     | 4     | 8      | 5      |

TABLE 15

Values of F for an Ascend algorithm when M = 256. Values of n are given in the first row.

| n:    | 10 | 12 | 14 | 16 | 18 | 20 |
|-------|----|----|----|----|----|----|
| LSE:  | 24 | 24 | 24 | 24 | 24 | 24 |
| 2DM:  | 60 | 60 | 60 | 60 | 60 | 60 |
| 3DM:  | 30 | 34 | 34 | 34 | 34 | 34 |
| HC:   | 16 | 16 | 16 | 16 | 16 | 16 |
| CCC:  | 36 | 54 | 56 | 0  | 0  | 0  |
| SE:   | 20 | 24 | 28 | 32 | 36 | 40 |
| dB:   | 0  | 0  | 0  | 0  | 0  | 0  |
| HN:   | 20 | 24 | 28 | 32 | 36 | 40 |
| 2HSE: | 30 | 38 | 44 | 48 | 54 | 62 |
| 2HdB: | 10 | 14 | 16 | 16 | 18 | 22 |

TABLE 16

Values of S for an Ascend algorithm when M = 256. Values of n are given in the first row.

| n:    | 10 | 12 | 14  | 16  | 18    | 20    |
|-------|----|----|-----|-----|-------|-------|
| LSE:  | 4  | 22 | 94  | 382 | 1,534 | 6,142 |
| 2DM:  | 34 | 34 | 320 | 704 | 1,472 | 3,008 |
| 3DM:  | 13 | 32 | 80  | 152 | 248   | 440   |
| HC:   | 4  | 8  | 12  | 16  | 20    | 24    |
| CCC:  | 18 | 54 | 54  | 112 | 113   | 116   |
| SE:   | 10 | 12 | 14  | 16  | 18    | 20    |
| dB:   | 10 | 12 | 14  | 16  | 18    | 20    |
| HN:   | 4  | 4  | 4   | 24  | 24    | 24    |
| 2HSE: | 2  | 2  | 2   | 2   | 4     | 4     |
| 2HdB: | 2  | 2  | 2   | 2   | 4     | 4     |

What has been described hereinbefore are methods and apparatus meeting all of the objectives of the invention. While only certain preferred features of the invention have been shown by way of illustration, many modifications and changes will occur to those skilled in the art without departing from the scope or spirit of the invention. For example, those skilled in the art may apply the teachings of the invention in the context of multiple instruction stream/ multiple data stream (MIMD) parallel computers as well as SIMD computers.

It is, therefore, to be understood that the claims appended hereto are intended to cover all such modifications and changes which fall within the true scope and spirit of the invention.

What is claimed is:

1. For implementing an Ascend algorithm having $2^n$ data items, each of which has a unique integer ID having a value between 0 and $2^n-1$ inclusive, where n is an integer, wherein said Ascend algorithm has n stages, 0 through n−1, and further wherein at each state i, $0 \leq i \leq n-1$, processing is performed on each pair of data items with IDs whose binary representation differ only in bit position i, on an Hierarchical Shuffle-Exchange (HSE) computer having $2^n$ processors, each of which has a unique ID having a value between 0 and $2^n-1$, inclusive wherein said HSE computer includes $2^{n-m}$ packaging modules, where m is an integer and n>m, said method comprising the steps of:

(a) storing each data item j, where j is an integer having a value between 0 and $2^n-1$ inclusive, in processor j;

(b) performing the first m stages of said Ascend algorithm by utilizing exchange connections and local unshuffle connections of said HSE computer, the exchange connections being connections between each given one of the processors and a respective other one of the processors having an ID identical to that of the given one of the processors, except for a least significant bit opposite to that of the given one of the processors, the local unshuffle connections being connections between each given one of the processors and a respective other one of the processors having an ID identical to that of the given one of the processors, except that the m lowest significance bits of the ID of the other one of the processors, are those of the given one of the processors, subjected to a right rotate;

(c) repositioning the data items by utilizing global unshuffle connections of said HSE computer, the global unshuffle connections being connections between each given one of the processors and a respective other one of the processors having an ID identical to that of the given one of the processors, except that the bits of the ID of the other one of the processors are those of the given one of the processors, wherein the n–m most significant bits are in the n–m least significant bit positions, and the m least significant bits are in the m most significant bit positions; and (d) repeating steps (b) and (c) until all the n stages of the Ascend algorithm have been completed.

2. A method as set forth in claim 1 further comprising the step of returning each data item j to processor j when n is not a multiple of m.

3. A method as set forth in claim 2 wherein said step of returning further comprises the step of utilizing local shuffle connections of said HSE computer followed by utilizing global shuffle connections of said HSE computer, the local shuffle connections being connections between each given one of the processors and a respective other one of the processors having an ID identical to that of the given one of the processors, except that the m lowest significance bits of the ID of the other one of the processors, are those of the given one of the processors, subjected to a left rotate, the global shuffle connections being connections between each given one of the processors and a respective other one of the processors having an ID identical to that of the given one of the processors, except that the bits of the ID of the other one of the processors are those of the given one of the processors, wherein the m most significant bits are in the m least significant bit positions, and the n–m least significant bits are in the n–m most significant bit positions.

4. A method as set forth in claim 2 wherein said step of returning further comprises the step of utilizing the local unshuffle connections of said HSE computer followed by utilizing global shuffle connections of said HSE computer, the global shuffle connections being connections between each given one of the processors and a respective other one of the processors having an ID identical to that of the given one of the processors, except that the bits of the ID of the other one of the processors are those of the given one of the processors, wherein the m most significant bits are in the m least significant bit positions, and the n–m least significant bits are in the n–m most significant bit positions.

5. A method for implementing an Ascend algorithm having $2^{n+1}$ data items, each of which has a unique integer ID in the range of 0 through $2^{n+1}-1$, where n is an integer, wherein said Ascend algorithm has n+1 stages, 0 through n, including first m+1 stages and further wherein at each stage i, $0 \leq i \leq n$, processing is performed on each pair of data itmes with IDs whose binary representation differ only in bit position i, on an Hierarchical de Bruijn (HdB) computer having $2^n$ processors, each of which has a unique ID having a value between 0 and $2^n-1$ inclusive, wherein HdB computer includes $2^{n-m}$ packaging modules, where m is an integer and n>m, said method comprising the steps of:

(a) storing each data item j, where j is an integer having a value between 0 and $2^{n+1}-1$ inclusive, in the processor whose ID is a largest integer less than or equal to j/2;

(b) performing the first m+1 stages of said Ascend algorithm by utilizing local unshuffle-replace connections of said HdB computer, the local unshuffle-replace connections being connections between each given one of the processors and a respective other one of the processors having an ID identical to that of the given one of the processors, except that the m lowest significance bits of the ID of the other one of the processors, including the i-th bit, are those of the given one of the processors, subjected to a right shift, the least significant bit being discarded, and a replace bit being inserted at the (m–1)th bit position;

(c) repositioning the data items by utilizing global unshuffle-replace connections of said HdB computer, the global unshuffle-replace connections being connections between each given one of the processors and a respective other one of the processors having an ID identical to that of the given one of the processors, except that the bits of the ID of the other one of the processors are those of the given one of the processors, wherein the n–m–1 most significant bits are in the n–m–1 least significant bit positions, the m least significant bits are in the m most significant bit positions, and a replace bit is in the (m+1)th most significant bit position; and (d) repeating steps (b) and (c) until all the n+1 stages of the Ascend algorithm have been completed.

6. A method as set forth in claim 5 further comprising the step of returning each data item j to the processor whose ID is the largest integer less than or equal to j/2, when n+1 is not a multiple of m+1.

7. A method as set forth in claim 6 wherein said step of returning further comprises the step of utilizing local shuffle-replace connections of said HdB computer followed by utilizing global shuffle-replace connections of said HdB computer, the local shuffle-replace connections being connections between each given one of the processors and a respective other one of the processors having an ID identical to that of the given one of the processors, except that the m lowest significance bits of the ID of the other one of the processors, including the i-th bit, are those of the given one of the processors, subjected to a left shift, the most significant of the m lowest significant bits being discarded, and a replace bit being inserted at the least significant bit position, the global shuffle-replace connections being connections between each given one of the processors and a respective other one of the processors having an ID identical to that of the given one of the processors, except that the bits of the ID of the other one of the processors are those of the given one of the processors, wherein the n–m–1 least significant bits are in the n–m–1 most significant bit positions, the m most significant bits are in the m least significant bit positions, and a replace bit is in the (m+1)th least significant bit position.

8. A method as set forth in claim 6 wherein said step of returning further comprises the step of utilizing the local unshuffle-replace connections of said HdB computer followed by utilizing the global shuff-replace connections of said HdB computer, the global shuffle-replace connections being connections between each given one of the processors and a respective other one of th processors having an ID identical to that of the given one of the processors, except that the bits of the ID of the other one of the processors are those of the given one of the processors, wherein the n−m−1 least significant bits are in the n−m−1 most significant bit positions, the m most significant bits are in the m least significant bit positions, and a replace bit is in the (m+1)th least significant bit position.

9. A method for implementing a Descent algorithm having $2^n$ data items, each of which has a unique integer ID having a value between 0 and $2^n-1$ inclusive; where n is an integer, wherein said Descent algorithm has n stages, 0 through n−1, and further wherein at each stage i, $0 \leq i \leq n-1$, processing is performed on each pair of data items with IDs whose binary representation differ only in bit position i, on an Hierarchical Shuffle-Exchange (HSE) computer having $2^n$ processors, each of which has a unique ID having a value between 0 and $2^n-1$ inclusive wherein said HSE computer includes $2^{n-m}$ packaging modules, where m is an integer and n>m, said method comprising the steps of:

(a) storing each data item j, where j is an integer having a value between 0 and $2^n-1$, inclusive, in processor j;

(b) repositioning the data items by utilizing global shuffle connections of said HSE computer, the global shuffle connections being connections between each given one of the processors and a respective other one of the processors having an ID identical to that of the given one of the processors, except that the bits of the ID of the other one of the processors are those of the given one of the processors, wherein the m most significant bits are in the m least significant bit positions, and the n−m least significant bits are in the n−m most significant bit positions;

(c) performing the stages n−1 through n−m of said Descend algorithm by utilizing local shuffle connectors and exchange connections of said HSE computer, the local shuffle connections being connections between each given one of the processors and a respective other one of the processors having an ID identical to that of the given one of the processors, except that the m lowest significance bits of the ID of the other one of the processors, are those of the given one of the processors, subjected to a left rotate, the exchange connections being connections between each given one of the processors and a respective other one of the processors having an ID identical to that of the given one of the processors, except for a least significant bit opposite to that of the given one of the processors; and (d) repeating steps of (b) and (c) until all the n stages of the Descend algorithm have been completed.

10. A method for implementing a Descend algorithm having $2^{n+1}$ data items, each of which has a unique integer ID having a value between 0 and $2^{n+1}$ inclusive, where n is an integer, wherein said Descend algorithm has n+1 stages, 0 through n, and further wherein at each stage i, $0 \leq i \leq n$, processing is performed on each pair of data items with IDs whose binary representation differ only in bit position i, on an Hierarchical de Bruijn (HdB) computer having $2^n$ processors, each of which has a unique ID having a value between 0 and $2^n-1$ inclusive, wherein said HdB computer includes $2^{n-m}$ packaging modules, where m is an integer and n>m, said method comprising the steps of:

(a) storing each data item j, where j is an integer having a value between 0 and $2^{n+1}-1$, inclusive, in the processor whose ID is a largest integer less than or equal to j/2;

(b) repositioning the data items by utilizing global shuffle-replace connections of said HdB computer, the global shuffle-replace connections being connections between each given one of the processors and a respective other one of the processors having an ID identical to that of the given one of the processors, except that the bits of the ID of the other one of the processors are those of the given one of the processors, wherein the n−m−1 least significant bits are in the n−m−1 most significant bit positions, the m most significant bits are in the m least significant bit positions, and a replace bit is in the (m+1)th least significant bit position;

(c) performing stages n through n−m of said Descend algorithm by utilizing local shuffle-replace connections of said HdB computer, the local shuffle-replace connections being connections between each given one of the processors and a respective other one of the processors having an ID identical to that of the given one of the processors, except that the m lowest significance bits of the ID of the other one of the processors, including the i-th bit, are those of the given one of the processors, subjected to a left shift, the most significant of the m lowest significant bits being discarded, and a replace bit being inserted at the least significant bit position; and (d) repeating steps (b) and (c) until all the n+1 stages of the Descend algorithm have been completed.

\* \* \* \* \*